US011977791B2

(12) United States Patent
Naruse

(10) Patent No.: US 11,977,791 B2
(45) Date of Patent: May 7, 2024

(54) EDITING METHOD FOR EDITING LAYOUT OF DISPLAYED OBJECTS INCLUDING FUNCTION FOR ENABLING SWITCHING OF SELECTION CONDITION DEFINING OBJECTS TO BE SELECTED BASED ON SELECTION OPERATION, AND CORRESPONDING RECORDING MEDIUM, INFORMATION PROCESSING APPARATUS, AND PRINTING APPARATUS

(71) Applicant: CASIO COMPUTER CO., LTD., Tokyo (JP)

(72) Inventor: Kenichi Naruse, Koganei (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/095,579

(22) Filed: Jan. 11, 2023

(65) Prior Publication Data

US 2023/0236775 A1 Jul. 27, 2023

(30) Foreign Application Priority Data

Jan. 21, 2022 (JP) .................................. 2022-008172

(51) Int. Cl.
*G06F 3/12* (2006.01)
*G06F 3/0482* (2013.01)

(52) U.S. Cl.
CPC .......... *G06F 3/1208* (2013.01); *G06F 3/1256* (2013.01); *G06F 3/0482* (2013.01)

(58) Field of Classification Search
USPC ....................................................... 358/1.15
See application file for complete search history.

(56) References Cited

U.S. PATENT DOCUMENTS

| 8,056,004 | B2 | 11/2011 | Kobashi |
| 8,788,936 | B2 | 7/2014 | Kobashi |
| 2019/0087994 | A1* | 3/2019 | Mizutani ................. G06T 11/60 |
| 2022/0261195 | A1* | 8/2022 | Fukui ..................... G06F 3/1285 |
| 2023/0205464 | A1* | 6/2023 | Ban ........................ G06F 3/1205 358/1.6 |

FOREIGN PATENT DOCUMENTS

| JP | 2004038437 A | 2/2004 |
| JP | 2007179261 A | 7/2007 |
| JP | 2007279831 A | 10/2007 |
| JP | 2016119015 A | 6/2016 |

* cited by examiner

*Primary Examiner* — Jacky X Zheng
(74) *Attorney, Agent, or Firm* — Holtz, Holtz & Volek PC

(57) ABSTRACT

An editing method being performed by a computer according to one aspect includes executing processing of: causing a display to display an editing screen on which a layout of an object is capable of being edited; and enabling switching of a selection condition for each object on the editing screen to be brought into one of a selected state and an unselected state based on an operation by a user. The switchable selection condition may include a combination of a first selection condition for bringing an object whose own area is entirely included in a range designated by an operation of designating the range into a selected state and a second selection condition for bringing an object whose own area is at least partially included in the designated range into a selected state.

17 Claims, 21 Drawing Sheets

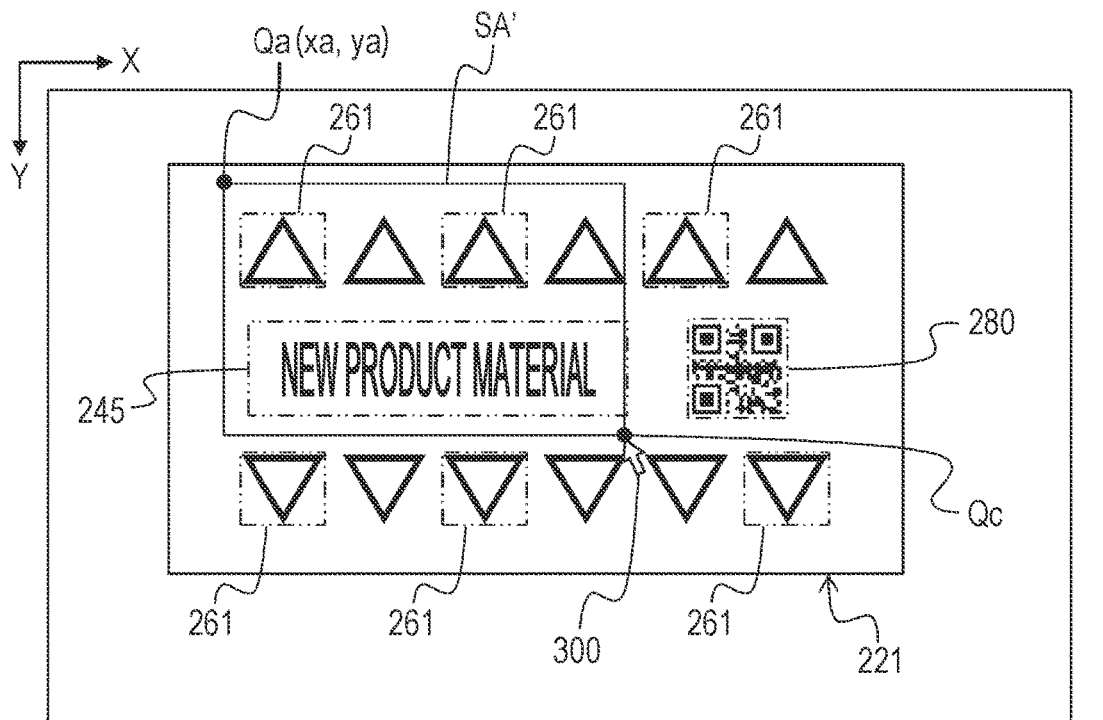
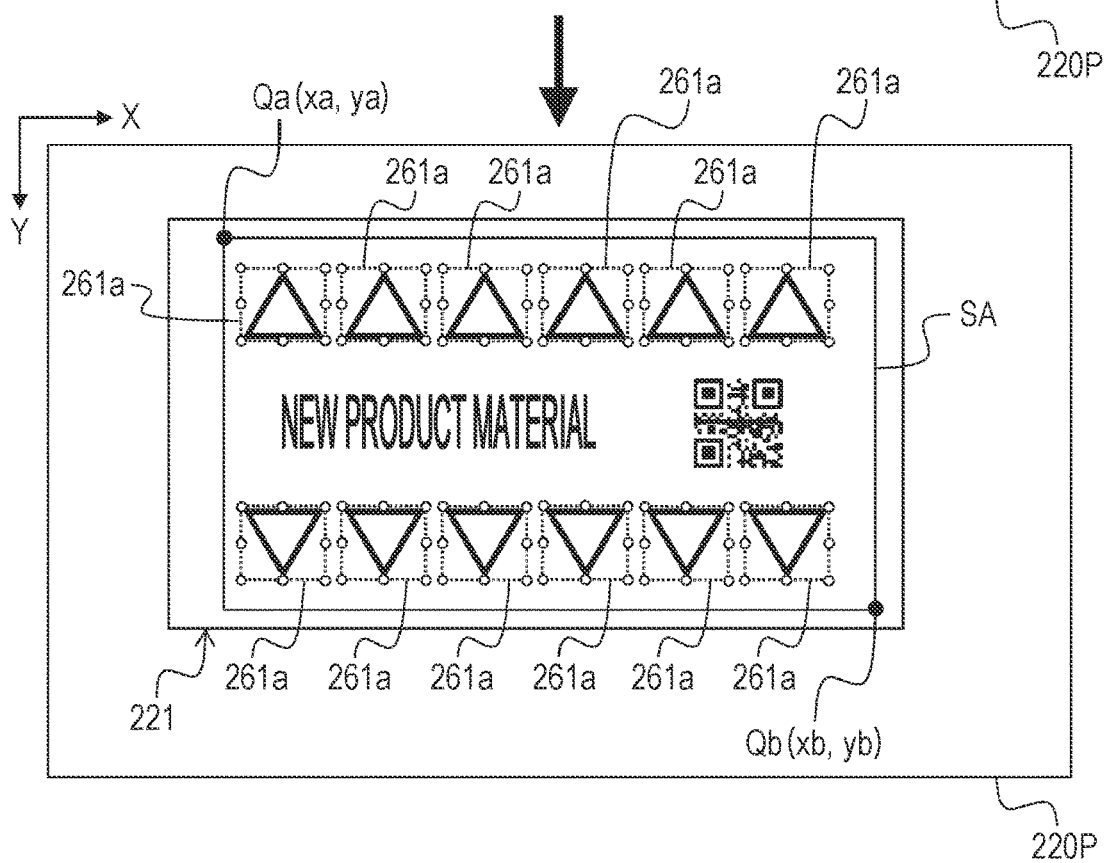
FIG. 11

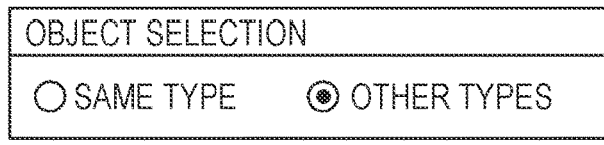
FIG. 12
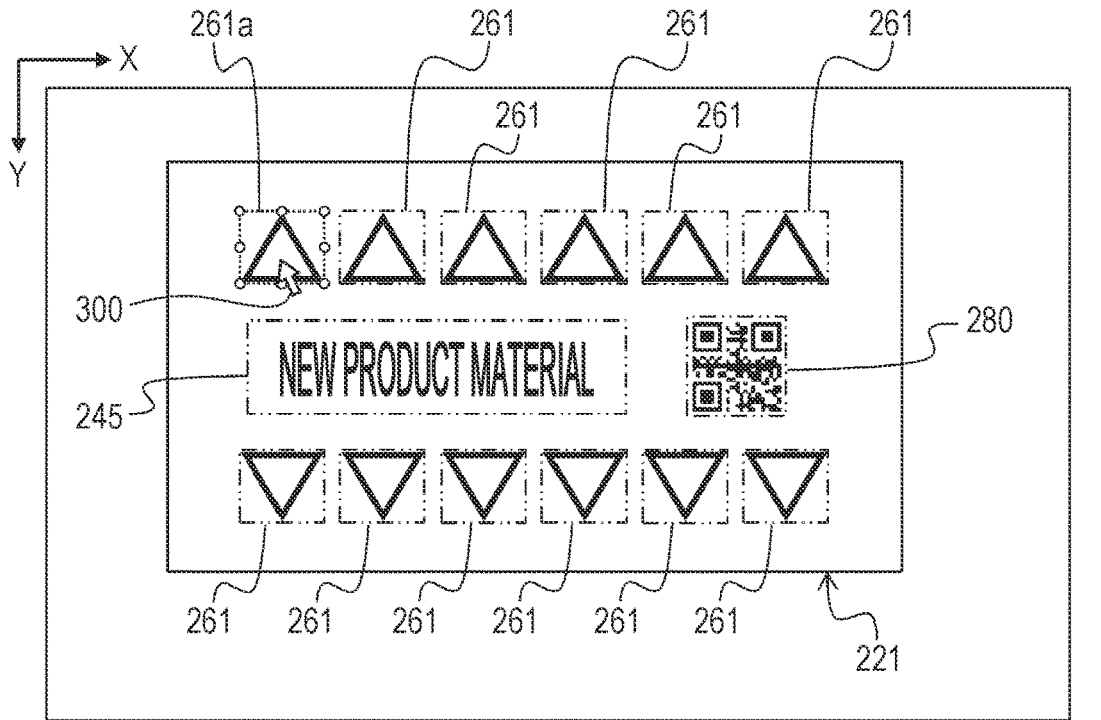
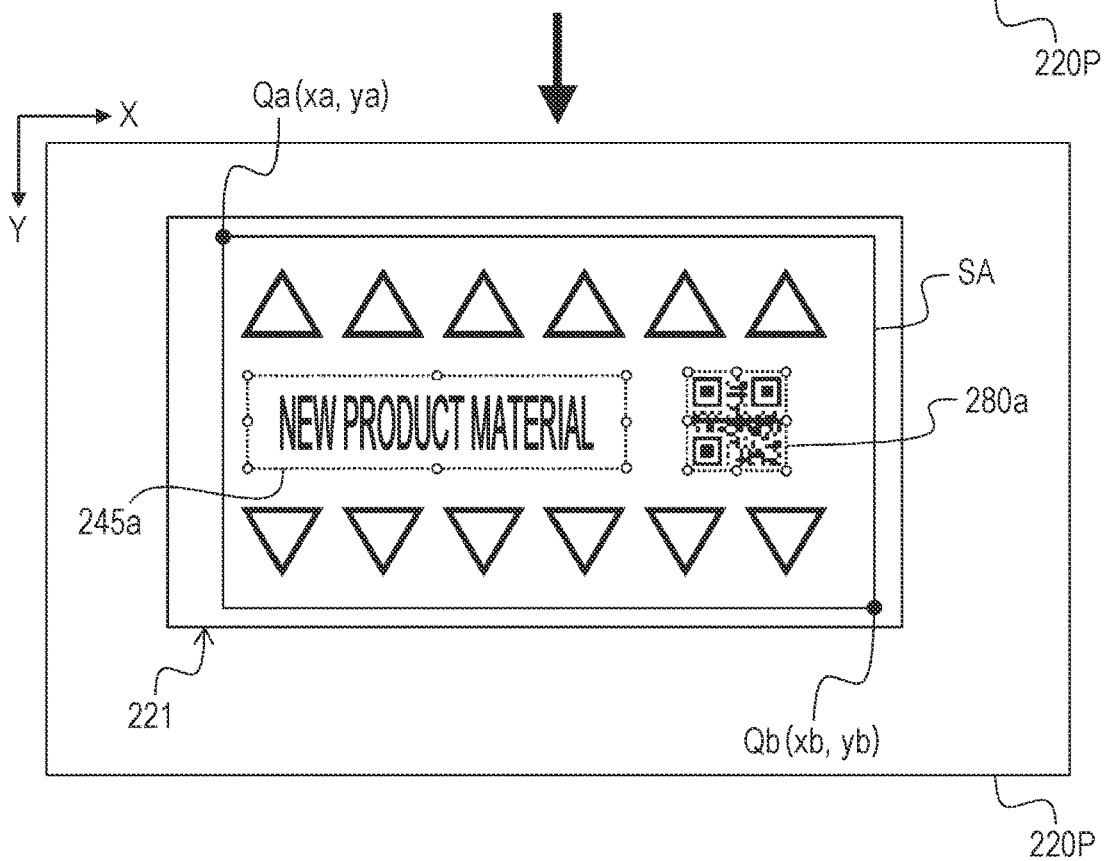

FIG. 14
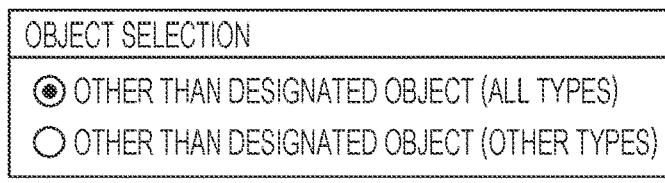
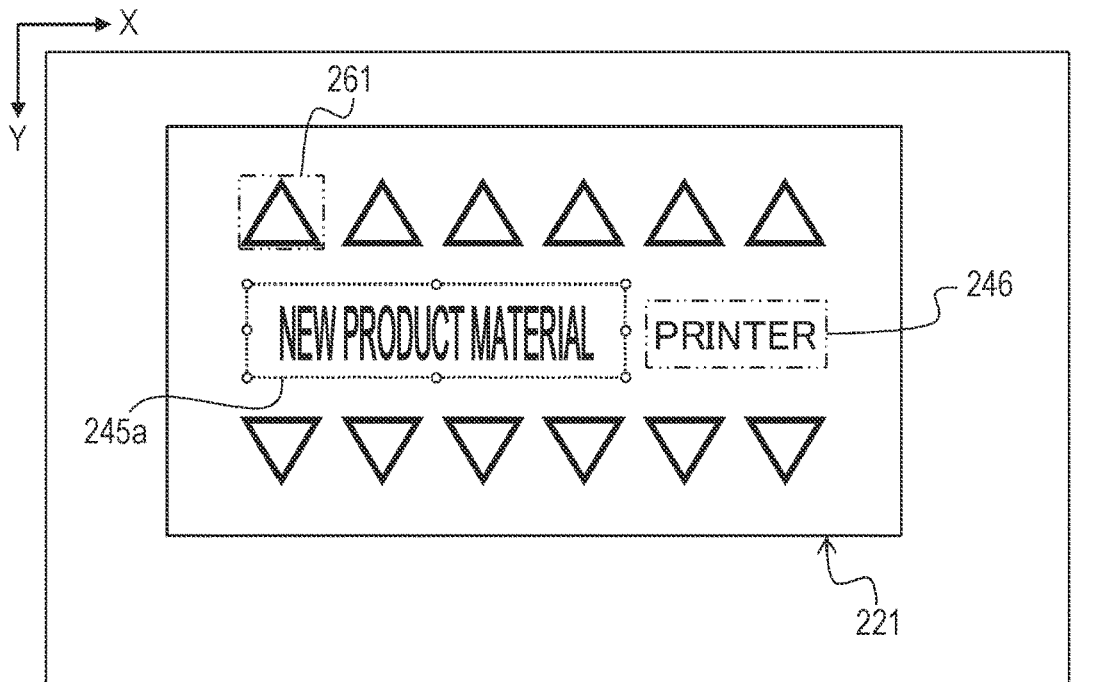
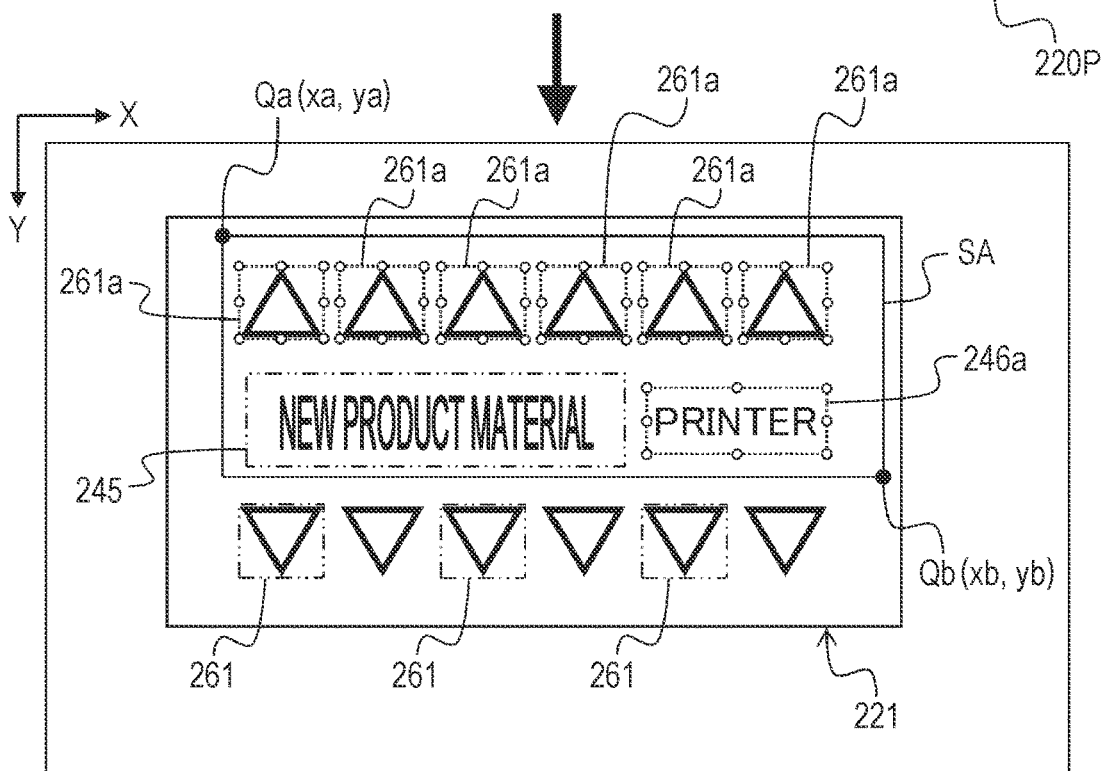

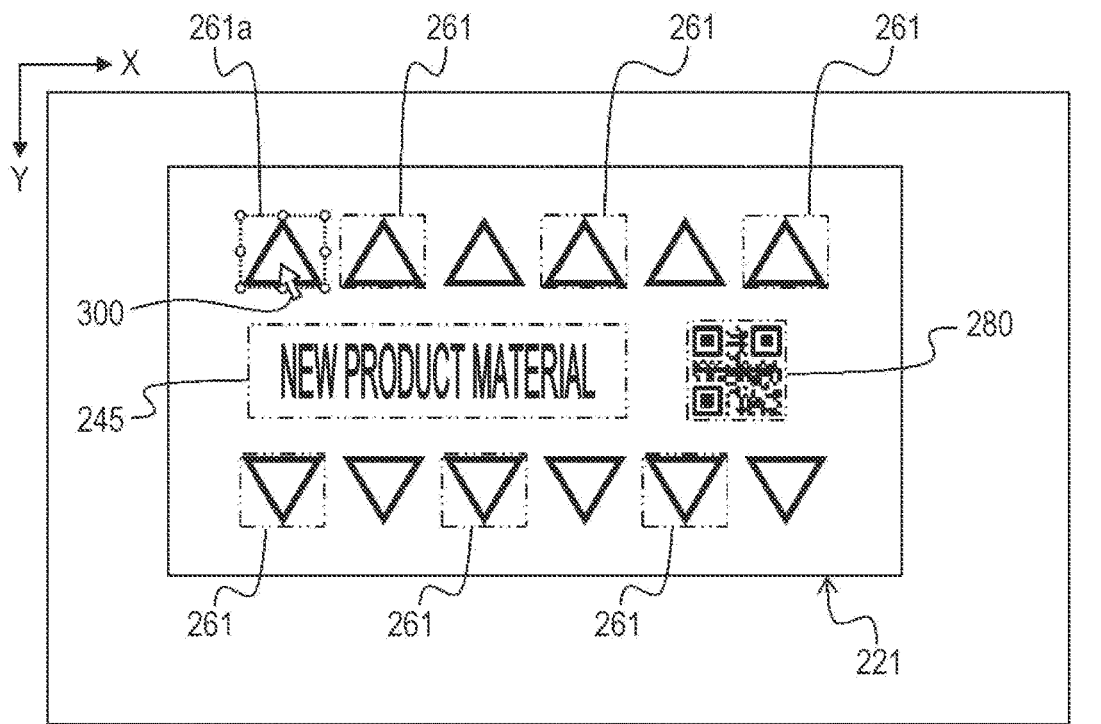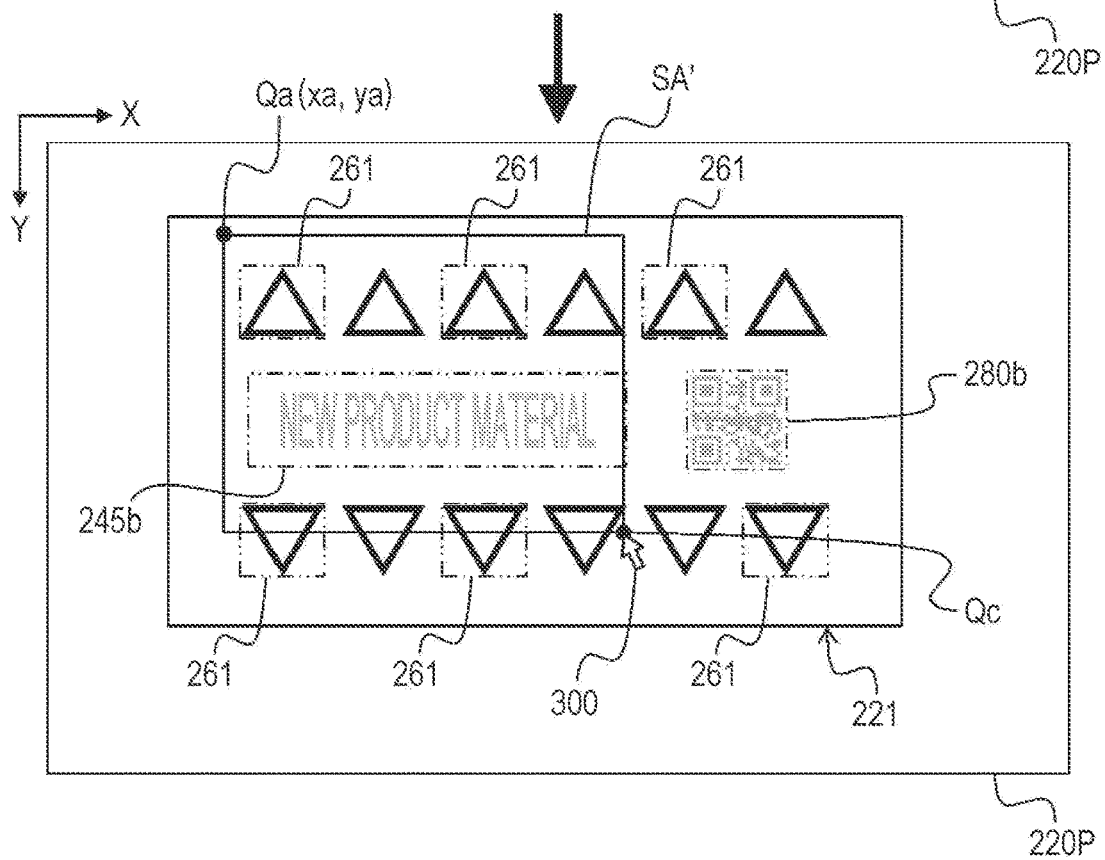
FIG. 15

EDITING METHOD FOR EDITING LAYOUT OF DISPLAYED OBJECTS INCLUDING FUNCTION FOR ENABLING SWITCHING OF SELECTION CONDITION DEFINING OBJECTS TO BE SELECTED BASED ON SELECTION OPERATION, AND CORRESPONDING RECORDING MEDIUM, INFORMATION PROCESSING APPARATUS, AND PRINTING APPARATUS

CROSS-REFERENCE TO RELATED APPLICATION

This application claims the priority to and benefit of Japanese Patent Application No. 2022-008172 filed on Jan. 21, 2022.

BACKGROUND

1. Technical Field

The present disclosure relates to an editing method, a recording medium, an information processing apparatus, and a printing apparatus.

2. Related Art

In a predetermined application, during editing of a layout of an object, a user can select a desired object from a plurality of objects arranged in an editing screen by performing a predetermined selection operation (see, for example, JP 2016-119015 A).

SUMMARY

An editing method being performed by a computer according to one aspect of the present disclosure includes executing processing of: causing a display to display an editing screen on which a layout of an object is capable of being edited; and enabling switching of a selection condition for each object on the editing screen to be brought into one of a selected state and an unselected state based on an operation by a user.

BRIEF DESCRIPTION OF THE DRAWINGS

FIG. 11 is a diagram illustrating an example of displaying objects when a range is designated by setting a selection condition to SAME TYPE;

FIG. 12 is a diagram illustrating an example of displaying objects when a range is designated by setting a selection condition to OTHER TYPES;

FIG. 14 is a diagram illustrating a third example of a selection condition and an example of displaying objects when a range is designated;

FIG. 15 is a diagram illustrating another example of a method of displaying objects when an operation of designating a range is performed;

DETAILED DESCRIPTION

Hereinafter, embodiments of the present disclosure will be described with reference to the drawings.

Figure 1:
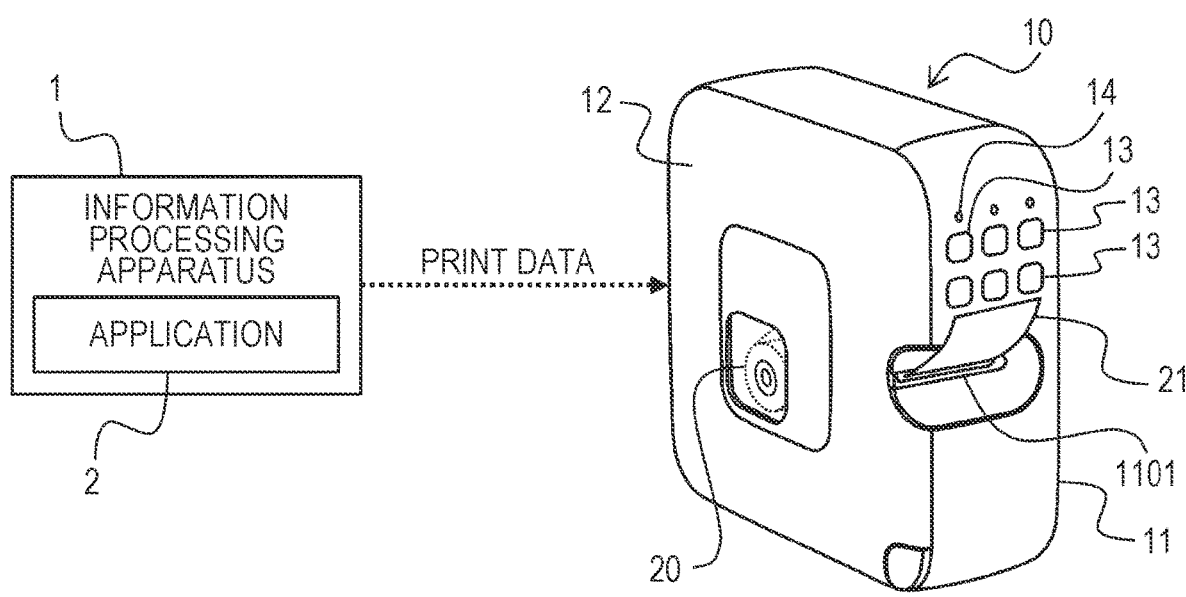
FIG. 1 is a diagram illustrating an example of a printing apparatus that can be used in combination with an information processing apparatus.
Figure 2:
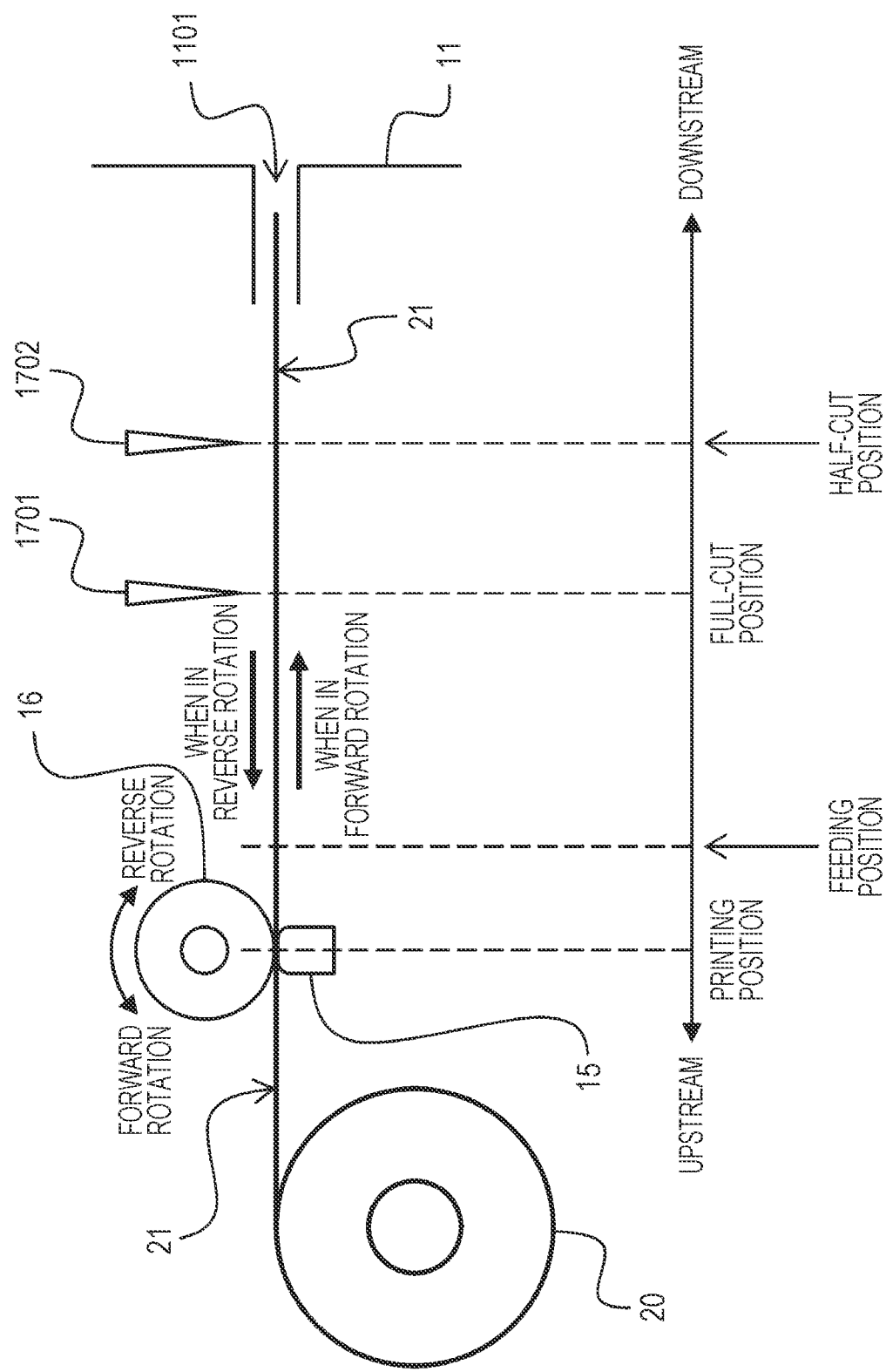
FIG. 2 is a diagram schematically illustrating a mechanism inside a printing apparatus.

FIG. 1 is a diagram illustrating an example of a printing apparatus that can be used in combination with an information processing apparatus. FIG. 2 is a diagram schematically illustrating a mechanism inside the printing apparatus. FIG. 2 schematically illustrates a mechanism along a conveyance path of a print medium in a thermosensitive printing apparatus.

The printing apparatus 10 illustrated in FIG. 1 can perform printing on a tape-shaped print medium 21 and cutting of the print medium 21 based on the print data transmitted from the information processing apparatus 1. The information processing apparatus 1 is an apparatus that can execute a dedicated application 2 supported by the printing apparatus 10, and can be, for example, a general-purpose computer such as a personal computer or a smartphone. The information processing apparatus 1 and the printing apparatus 10 can perform wireless communication according to a known short-range wireless communication standard or wired communication via a transmission cable.

The printing apparatus 10 illustrated in FIG. 1 includes a mounter that mounts a cassette (medium adapter) that supplies a print medium 21 in an apparatus housing including a first member 11 and a second member 12, a conveyance mechanism that conveys the print medium 21, a printing mechanism that performs printing on the print medium 21, and a cutting mechanism that cuts the print medium 21. In addition, various electronic components such as a control circuit that controls operations of the conveyance mechanism, the printing mechanism, and the cutting mechanism are provided in the apparatus housing. The second member (lid member) 12 is detachable from the first member 11. The cassette (medium adapter) in which a roll 20 around which the print medium 21 is wound is accommodated can be mounted in the apparatus housing by detaching the second member 12 from the first member 11. As illustrated in FIG. 2, the print medium 21 unwound from the roll 20 is conveyed along a conveyance path passing between a thermal head 15 and a platen roller 16. The thermal head 15 is a part of the printing mechanism, and applies thermal energy to the print medium 21. The platen roller 16 is a part of the conveyance mechanism, and conveys the print medium 21 along the conveyance path. The thermal head 15 and the platen roller 16 are configured to sandwich the print medium 21 at least when conveying the print medium 21. The platen roller 16 can perform, for example, rotation (forward rotation) in a direction of conveying the print medium 21 toward the downstream of the conveyance path, and rotation (reverse rotation) in a direction of conveying the print medium 21 toward the upstream of the conveyance path. The print medium 21 conveyed downstream along the conveyance path is discharged to the outside of the printing apparatus 10 from a discharge port 1101 provided in the first member 11.

When performing printing on the print medium 21 based on the print data, the printing apparatus 10 first conveys the print medium 21 so that the starting point (leading end on the downstream side of the conveyance path) of the print medium 21 is at the feeding position illustrated in FIG. 2. Thereafter, the printing apparatus 10 performs printing on the print medium 21 by the thermal head 15 while the platen roller 16 is rotated forward to convey the print medium 21. Furthermore, the printing apparatus 10 can cut the print medium 21 with a first cutter 1701 or a second cutter 1702 at a predetermined timing, for example, after the printing on the print medium 21 is completed. The first cutter 1701 is a cutter that performs cutting called full cutting on the print medium 21, and cuts the entire print medium 21 at a full-cut position into two. The second cutter 1702 is a cutter that performs cutting called half cutting on the print medium 21. The second cutter 1702 cuts the print medium 21 at a half-cut position. When the print medium 21 is an adhesive tape type medium having a multilayer structure including an adhesive layer and release paper, the second cutter 1702 cuts other layers other than the release paper along a half-cut line of the print medium 21 overlapping the half-cut position. The second cutter 1702 may cut the half-cut line of the print medium 21 overlapping the half-cut position in a perforated manner in which a cut section and an uncut section are repeated.

As described above, the printing apparatus 10 illustrated in FIG. 1 can perform printing on the print medium 21 and cutting of the print medium 21 based on the print data transmitted from the information processing apparatus 1. Therefore, in the printing apparatus 10 illustrated in FIG. 1, a keyboard that can be used to create print data is omitted. Operation buttons 13 and display lamps 14 related to the operation of the printing apparatus 10 are arranged on the outer surface of the first member 11 of the printing apparatus 10 illustrated in FIG. 1. The operation buttons 13 include, for example, a button for turning on and off power supply, a button for switching a type (standard) of wireless communication, and a button for reprinting. The display lamps 14 include, for example, a lamp indicating an on/off state of the power supply, a lamp indicating a type of valid wireless communication, and a lamp indicating an error.

Figure 3:
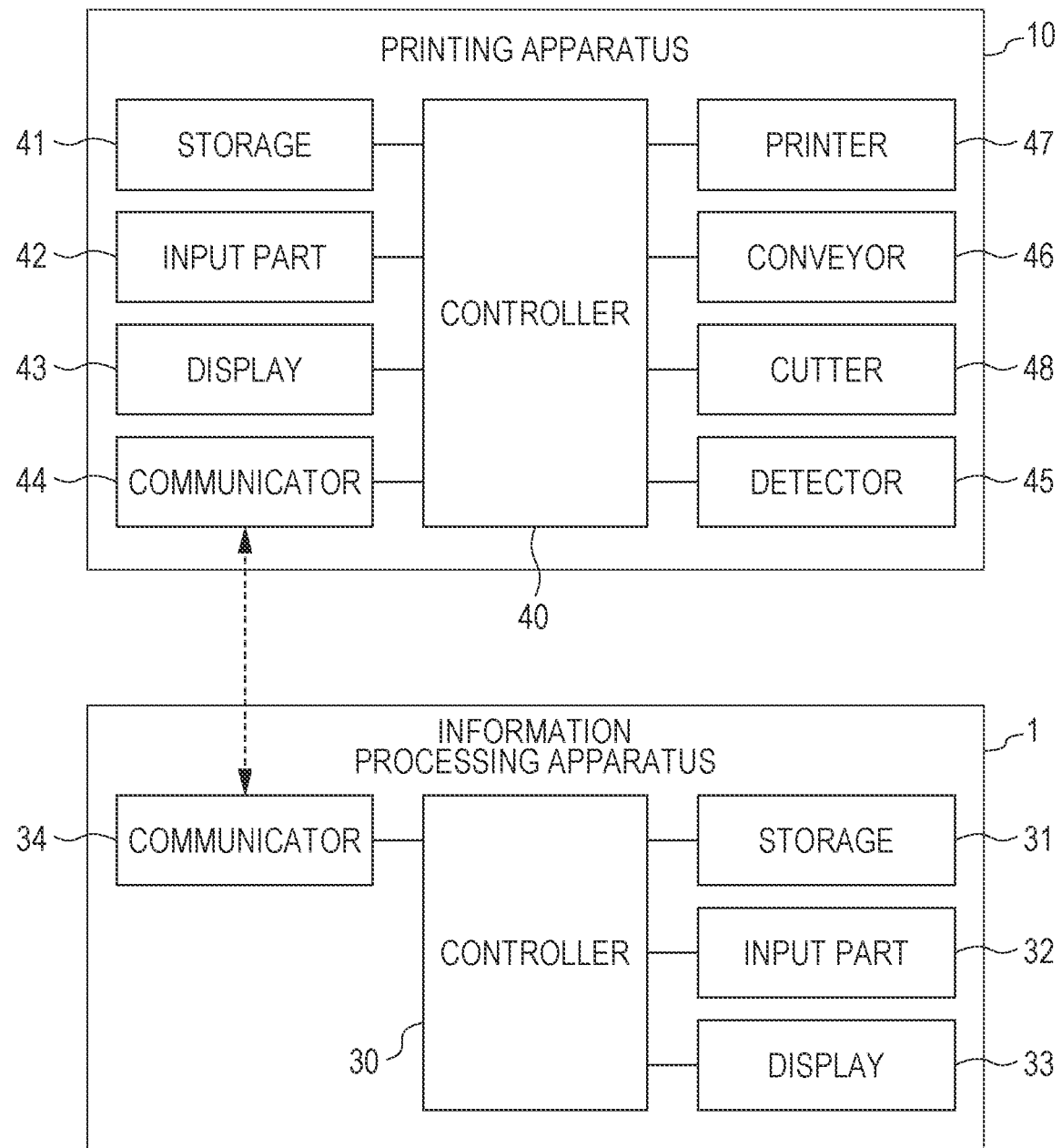
FIG. 3 is a block diagram illustrating a configuration example of an information processing apparatus and a printing apparatus.

FIG. 3 is a block diagram illustrating a configuration example of an information processing apparatus and a printing apparatus. Each block in the information processing apparatus 1 and the printing apparatus 10 in FIG. 3 exemplifies a functional configuration, and is associated with a hardware configuration as described below.

The information processing apparatus 1 includes a controller 30, a storage 31, an input part 32, a display 33, and a communicator 34. The controller 30 controls various operations that can be performed by the information processing apparatus 1. The controller 30 is a processor such as a central processing unit (CPU), and controls the operation of the information processing apparatus 1 by executing a program of an operating system (OS) and various application programs stored in the storage 31. The application program executed by the processor includes an application program to be linked with the printing apparatus 10.

The storage 31 stores various types of information and the like that can be used to control the operation of the information processing apparatus 1 by the controller 30. The storage 31 can store, for example, a program executed by the processor as the controller 30, data referred to during execution of the program, data generated during execution of the program, and the like. The storage 31 includes a read only memory (ROM) and a random access memory (RAM). The storage 31 may include a built-in auxiliary storage device such as a hard disk drive (HDD) or a solid state drive (SSD). The storage 31 may include a portable recording medium such as a memory card or a universal serial bus (USB) memory.

The input part 32 receives an operation of inputting various types of information to the information processing apparatus 1. The input part 32 includes, for example, a keyboard and a mouse. The display 33 displays various types of information related to the operation of the information processing apparatus 1. The display 33 includes, for example, a liquid crystal display. In a case where the information processing apparatus 1 is a tablet computer or a smartphone, the combination of the input part 32 and the display 33 may include a touch panel display in which a digitizer (position detector) is disposed to overlap a display area of a liquid crystal display.

The communicator 34 communicates with the printing apparatus 10 at least in accordance with the communication standard applied to the printing apparatus 10. The communicator 34 includes a communication interface such as, for example, Wi-Fi (registered trademark) and Bluetooth Low Energy (BLE, registered trademark), which can wirelessly communicate with an external apparatus according to a known short-range wireless communication standard. The communicator 34 may include, for example, a terminal to which a transmission cable having a general-purpose connector such as a USB cable can be connected.

Note that the information processing apparatus 1 is not limited to the configuration described above with reference to FIG. 3, and may include other configurations. Furthermore, one block in the information processing apparatus 1 illustrated in FIG. 3 is not limited to a single piece of hardware, and may be a combination of a plurality of pieces of hardware. For example, the controller 30 may include a first processor such as a CPU that processes a program and a second processor such as a digital signal processor (DSP) or a graphics processing unit (GPU) that controls display on the display 33. Furthermore, a plurality of blocks in the information processing apparatus 1 illustrated in FIG. 3 may be realized by single hardware, or hardware corresponding to one block may include a hardware element corresponding to a function of another block.

The printing apparatus 10 includes a controller 40, a storage 41, an input part 42, a display 43, a communicator 44, a detector 45, a conveyor 46, a printer 47, and a cutter 48. The controller 40 controls various operations that can be performed by the printing apparatus 10. The controller 40 is a processor such as a CPU, and controls the operation of the printing apparatus 10 by executing an OS program stored in the storage 41 and various programs related to printing on the print medium 21. Various programs related to printing on the print medium 21 include, for example, a program related to communication with the information processing apparatus 1, and a program for controlling the operations of the conveyor 46, the printer 47, and the cutter 48 based on print data.

The storage 41 stores various types of information and the like that can be used to control the operation of the printing apparatus 10 by the controller 40. The storage 41 can store, for example, a program executed by the processor as the controller 40, print data referred to during execution of the program, and the like. The storage 41 includes a ROM and a RAM. The storage 41 may include a portable recording medium such as a memory card or a USB memory.

The input part 42 receives an operation of inputting various types of information to the printing apparatus 10. The display 43 displays various types of information related to the operation of the information processing apparatus 1. In the printing apparatus 10 illustrated in FIG. 1, the operation buttons 13 correspond to the input part 42, and the display lamps 14 correspond to the display 43. Note that the input part 42 of the printing apparatus 10 may include, for example, a keyboard that can be used to input texts and the like to be printed on the print medium 21. Furthermore, the display 43 of the printing apparatus 10 may include, for example, a display device that can display text information, such as a liquid crystal display.

The communicator 44 communicates with an external apparatus such as the information processing apparatus 1 according to a predetermined communication standard. The communicator 44 includes, for example, a communication interface that can wirelessly communicate with an external apparatus according to a known short-range wireless communication standard such as Wi-Fi and BLE. The communicator 44 may include, for example, a terminal to which a transmission cable having a general-purpose connector such as a USB cable can be connected.

The detector 45 detects various types of information regarding the print medium 21. The detector 45 includes, for example, a first sensor for detecting whether or not a cartridge (medium adapter) housing the roll 20 is mounted and the width of the roll 20 (print medium 21), and a second sensor for detecting the presence or absence of the print medium 21 on the conveyance path.

The conveyor 46 conveys the print medium 21 in accordance with a control signal from the controller 40. The conveyor 46 corresponds to the above-described conveyance mechanism, and includes the platen roller 16, a motor that rotates the platen roller 16, and an encoder that acquires information indicating a conveying amount of the print medium 21. The printer 47 performs printing on the print medium 21 in accordance with a control signal from the controller 40. The printer 47 corresponds to the above-described printing mechanism, and includes the thermal head 15, a control circuit that controls a current applied to a heat generating element of the thermal head 15, and a thermistor that detects the temperature of the thermal head 15. The cutter 48 cuts the print medium 21 in accordance with a control signal from the controller 40. The cutter 48 corresponds to the above-described cutting mechanism and includes the first cutter 1701, the second cutter 1702, and a motor that operates each cutter.

Note that the printing apparatus 10 is not limited to the configuration described above with reference to FIG. 3, and may include other configurations. For example, the detector 45 of the printing apparatus 10 may include a sensor for detecting the color of the print medium 21 and a sensor for moving the leading end of the print medium 21 to the feeding position described above with reference to FIG. 2. In the printing apparatus 10, some of the configurations described above with reference to FIG. 3 may be omitted. For example, in the cutter 48 of the printing apparatus 10, the second cutter 1702 that half-cuts the print medium 21 may be omitted. Furthermore, the cutter of the cutter 48 may be configured to operate by an external force applied when the user presses a predetermined button to cut the print medium 21.

As described above, the information processing apparatus 1 can execute an application program for creating print data. When the application program is activated in the information processing apparatus 1, an editing screen (display screen) on which the layout of objects such as texts and graphics to be printed on the print medium 21 is capable of being edited is displayed on the display 33.

Figure 4:
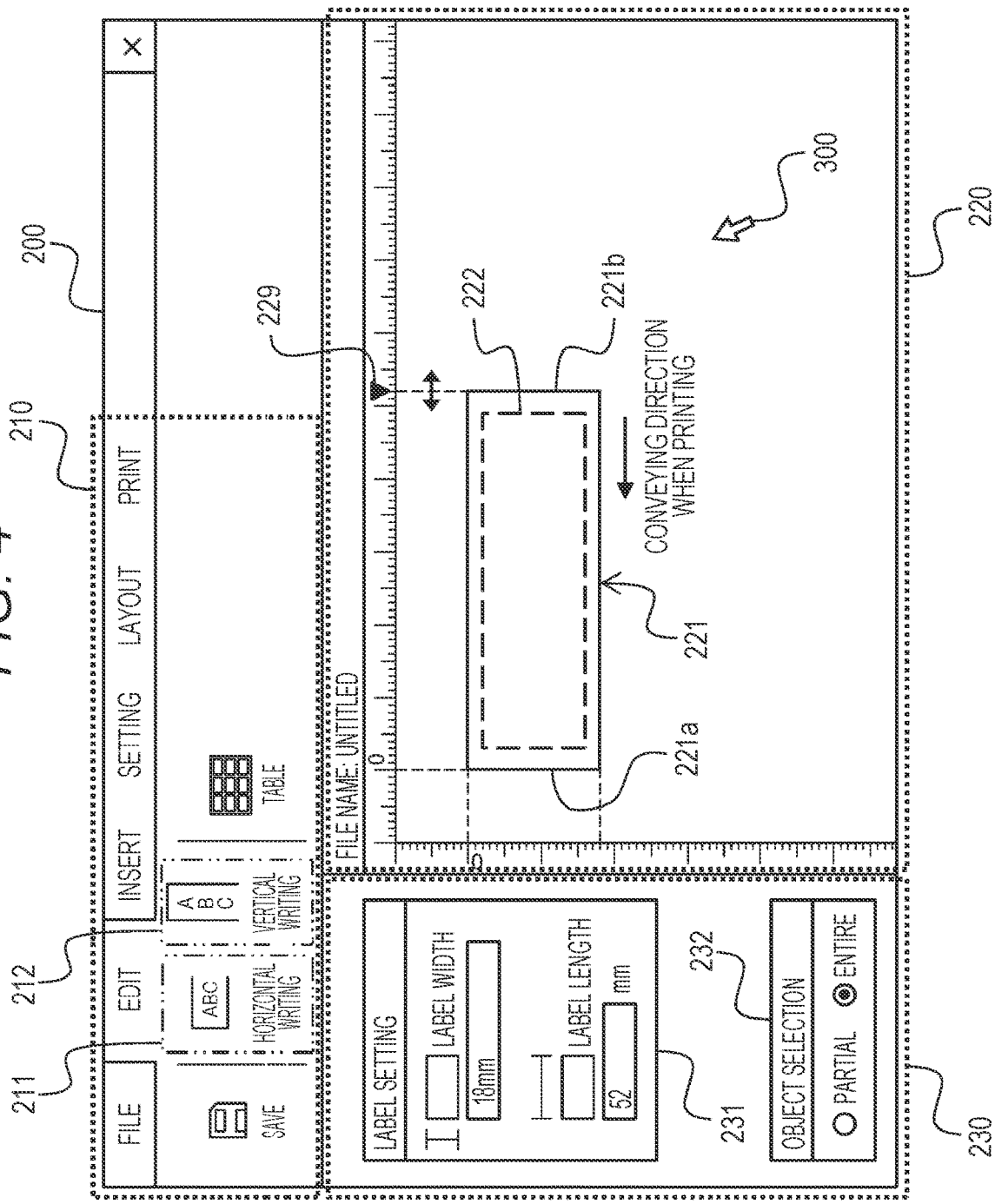
FIG. 4 is a diagram illustrating an example of a display screen of an application for editing a layout of an object.

FIG. 4 is a diagram illustrating an example of the editing screen on which the layout of objects is capable of being edited. An editing screen 200 illustrated in FIG. 4 is displayed as one window (work area) of the application in the entire or a part of the display area of the display 33.

The editing screen 200 includes a menu area 210, an editing area 220, and an auxiliary information area 230. In the menu area 210, processing that can be executed by the application is displayed in a mode that can be designated by an operation of a keyboard or a mouse. In the menu area 210, a button 211 for selecting processing of inputting a character string, which is one of objects, in horizontal writing, a button 212 for selecting processing of inputting a character string in vertical writing, and the like are displayed. In the editing area 220, a medium area 221 indicating the print medium 21 and objects such as texts and graphics to be printed on the print medium 21 are displayed. In the auxiliary information area 230, information 231 indicating dimensions of the medium area 221, information 232 indicating an object selection condition, and the like are displayed.

The medium area 221 in the editing area 220 illustrated in FIG. 4 is shown in the assumption that the conveying direction (in other words, the conveying direction when the platen roller 16 of FIG. 2 is rotated forward) at the time of printing of the print medium 21 used for printing is the leftward direction. In this case, the length of the left side 221*a* (and the right side 221*b*) of the medium area 221 is the width of the print medium 21 used for printing, and corresponds to the label width in the information 231 of the auxiliary information area 230. The label width can be selected from, for example, widths of the print medium 21 supported by the printing apparatus 10 used for printing on the print medium 21. Further, the distance from the left side 221*a* to the right side 221*b* of the medium area 221 is the length of the label (medium piece of the print medium 21) to be created by performing printing on the print medium 21 by the printing apparatus 10, and corresponds to the label length in the information 231 of the auxiliary information area 230. The label length can be, for example, set to any length equal to or longer than the shortest length supported by the printing apparatus 10 used for printing on the print medium 21. The label length can be changed, for example, by moving a slider 229 of the editing area 220 along the ruler or by inputting a numerical value indicating the label length in the information 231 of the auxiliary information area 230.

A dashed rectangle 222 in the medium area 221 exemplified in FIG. 4 indicates a boundary between a printable area and a margin area set in the outer peripheral portion of the medium area 221 when printing is performed on the print medium 21 by the printing apparatus 10. The user of the information processing apparatus 1 executing the application edits the layout of objects such as texts or graphics so that the objects fit within a printable area surrounded by the dashed rectangle 222, for example.

Figure 5:
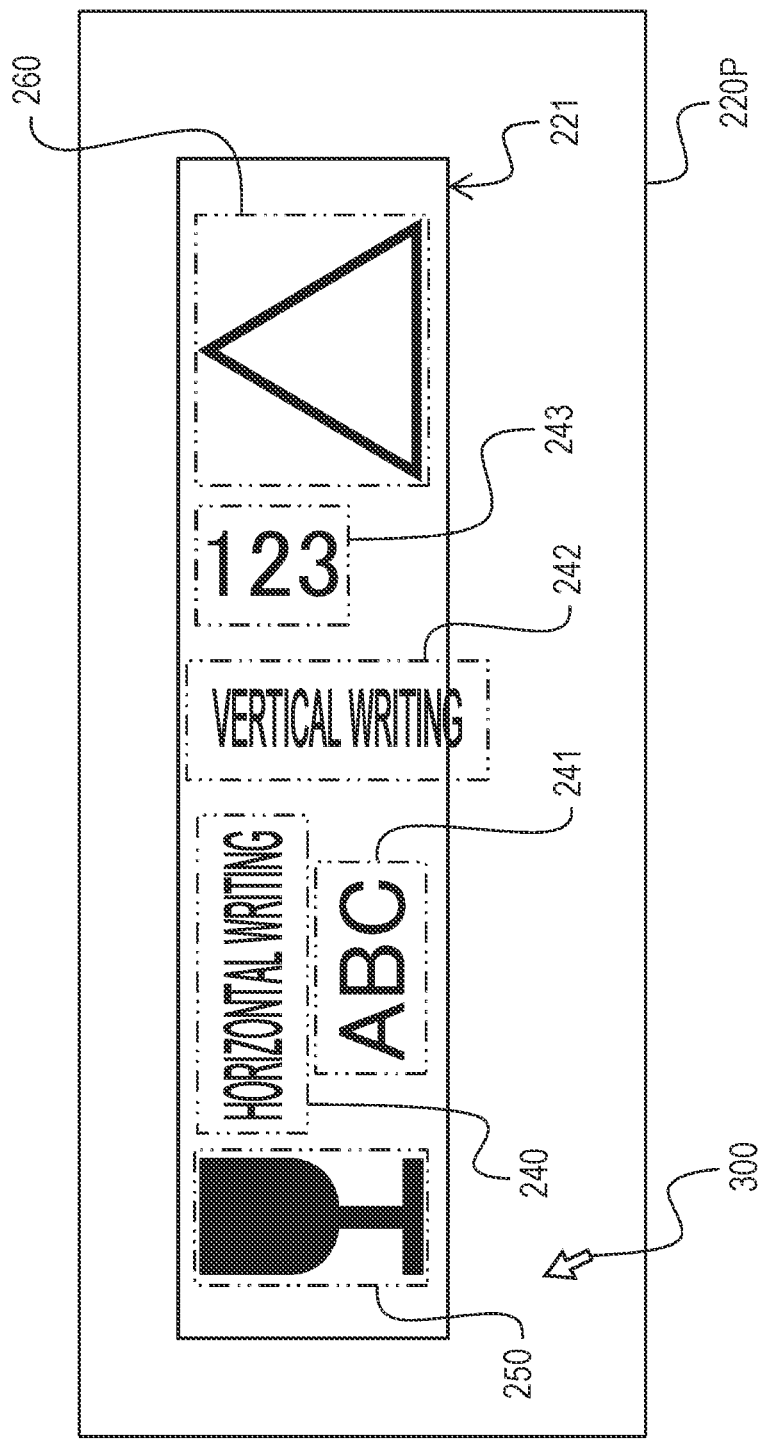
FIG. 5 is a diagram illustrating a first example of a plurality of objects arranged in an editing screen.

FIG. 5 is a diagram illustrating a first example of a plurality of objects arranged in the editing screen. FIG. 5 illustrates a portion of the editing area 220 of the editing screen 200 illustrated in FIG. 4 where the medium area 221 is displayed and a partial area 220P corresponding to a peripheral portion thereof.

In the partial area 220P illustrated in FIG. 5, four textual objects 240 to 243, one graphical object 250 of a first type, and one graphical object 260 of a second type are arranged. Note that the dashed-two dotted rectangles in the objects 240 to 243, 250, and 260 are illustrated for making the shapes and dimensions of the objects (in other words, areas recognized as objects in the editing screen 200) to be easily recognized, and are not displayed in the editing screen 200 including the partial area 220P displayed on the display 33 of the information processing apparatus 1.

Generally, the operation of selecting one or more objects among the objects 240 to 243, 250, and 260 arranged in the partial area 220P is roughly divided into two types, that is, an operation of directly designating an object to be selected and an operation of designating a range in the editing area 220. The operation of directly designating the object to be selected is, for example, an operation of moving the mouse to move a pointer 300 to a position (more specifically, in an area represented by a dashed-two dotted rectangle in FIG. 5) overlapping with the object to be selected (for example, the textual object 240) and then clicking the mouse. The operation of designating a range in the editing area 220 is, for example, an operation of dragging a mouse. In a case where the information processing apparatus 1 includes the touch panel display described above, an object (more specifically, in an area indicated by a dashed-two dotted rectangle in FIG. 5) displayed on the touch panel display can be directly designated (selected) by touching the object with a finger, a stylus, or the like. Furthermore, in a case where the information processing apparatus 1 includes the touch panel display described above, a range can be designated in the editing area 220 by moving a finger, a stylus, or the like brought into contact with one point in the editing area 220 to another point and releasing the contact.

In a case where an operation of designating a range in the editing area 220 is performed in the conventional application, a selection condition for each of the objects to be brought into one of a selected state and an unselected state based on the designated range is defined by one of the following two selection conditions. A first selection condition is a selection condition for bringing objects entirely included in the designated range into a selected state, and bringing the other objects into an unselected state. A second selection condition is a selection condition for bringing objects at least partially included in the designated range into a selected state and bringing the other objects into an unselected state. The object entirely included in the designated range is, for example, an object in which the entire area in the dashed-two dotted rectangle illustrated in FIG. 5 is included in the designated range. The object at least partially included in the designated range is, for example, an object in which at least a part of the area in the dashed-two dotted rectangle illustrated in FIG. 5 is included in the designated range.

Which of the first selection condition and the second selection condition is to be applied depends on application. For this reason, the selection condition to be applied to each application for editing the layout of objects may be different from the user-friendly selection condition, which may reduce the usability of the application. In addition, in a case where any one of the first selection condition and the second selection condition is fixed, it may be difficult to select only a plurality of desired objects by an operation of designating a range. In a case where it is difficult to select only the plurality of desired objects by the operation of designating the range, the user performs, for example, an operation of directly designating each of the plurality of objects while pressing a specific key.

On the other hand, in the application according to the embodiment of the present disclosure, the user can switch between the first selection condition and the second selection condition as the object selection condition when the operation of designating the range is performed. For example, the user can designate the object selection condition when the operation of designating the range is performed as one of "ENTIRE" corresponding to the first selection condition and "PARTIAL" corresponding to the second selection condition by the radio buttons in the information 232 indicating the object selection condition displayed on the editing screen 200 illustrated in FIG. 4. In addition, during execution of the application, the user can switch an object selection condition when an operation of designating a range is performed using the radio buttons in the information 232. Note that the information 232 indicating the object selection condition is not limited to be displayed in the auxiliary information area 230 of the editing screen 200 illustrated in FIG. 4, and may be displayed in another area in the editing screen 200. Furthermore, for example, the information 232 indicating the object selection condition may be always displayed in any area in the editing screen 200 while the application is being executed, or may be displayed when an operation such as setting change using the menu area 210 is performed. Furthermore, the information 232 indicating the object selection condition is not limited to the inside of the editing screen 200, and for example, may be displayed in a sub screen (sub window) different from the editing screen 200, and may be configured capable of changing the display positions in the display area of the display 33 independently from the editing screen 200.

Figure 6:
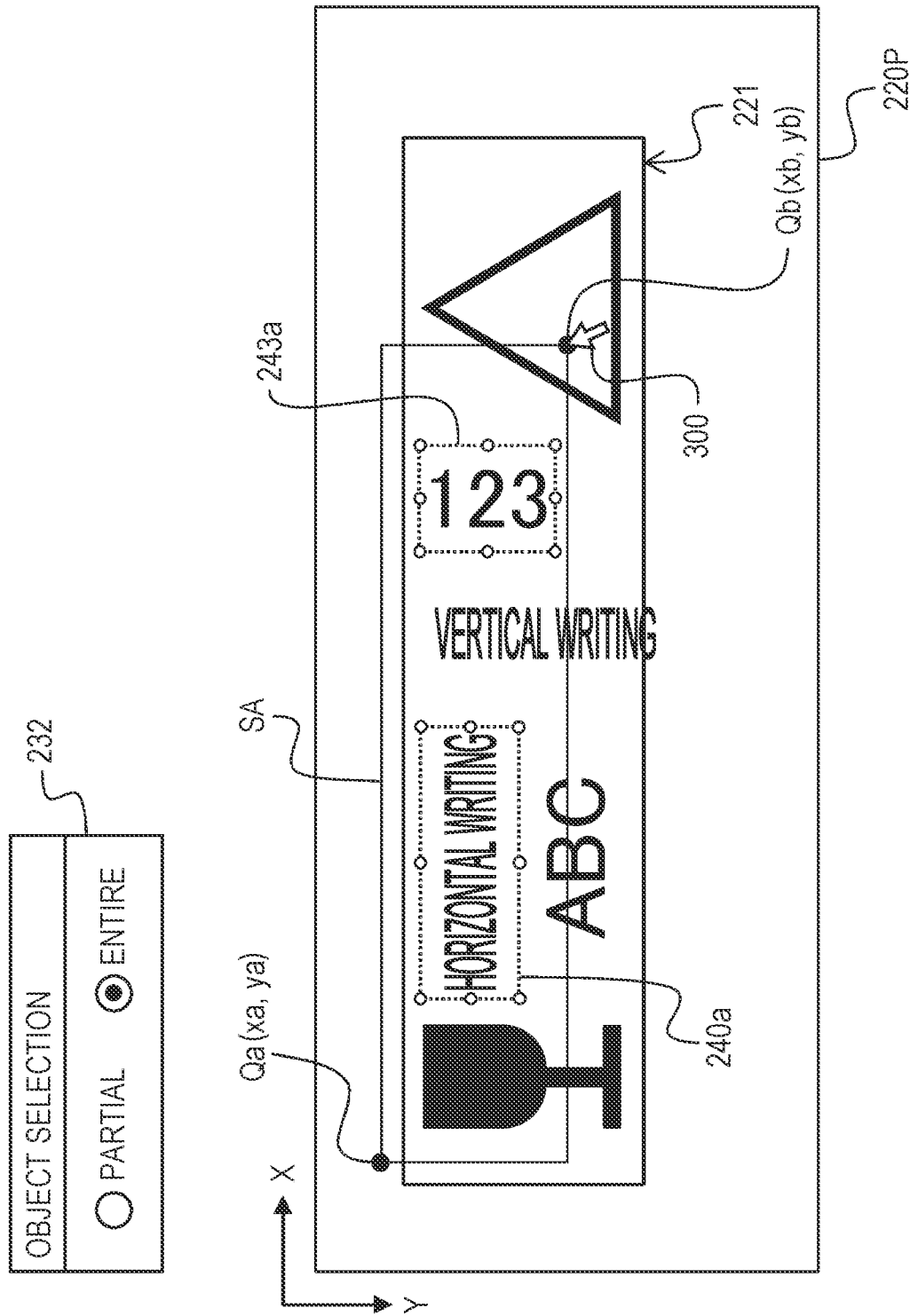
FIG. 6 is a diagram illustrating an example of displaying objects when a range is designated by setting a selection condition to ENTIRE.
Figure 7:
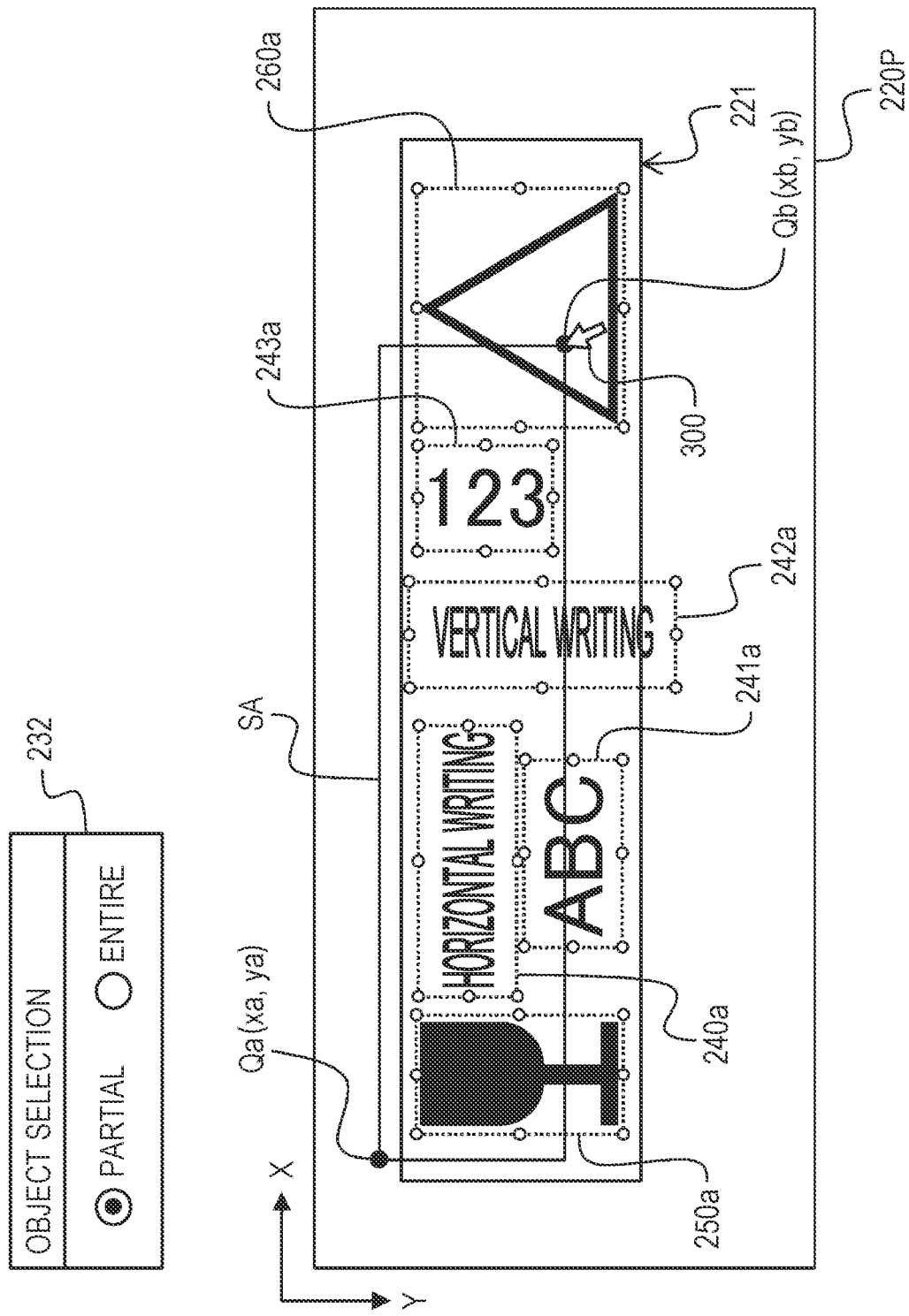
FIG. 7 is a diagram illustrating an example of displaying objects when a range is designated by setting a selection condition to PARTIAL.

FIG. 6 is a diagram illustrating an example of displaying objects when a range is designated by setting a selection condition to the "ENTIRE". FIG. 7 is a diagram illustrating an example of displaying objects when a range is designated by setting a selection condition to the "PARTIAL". FIGS. 6 and 7 each illustrate an example of displaying objects when an operation of designating a range in the partial area 220P in which the objects 240 to 243, 250, and 260 illustrated in FIG. 5 are arranged is performed. The XY orthogonal coordinate system in FIGS. 6 and 7 is a coordinate system set in the display area of the display 33 (or the editing area 220 of the editing screen 200). In the X axis, the rightward direction is the positive direction, and xb>xa is satisfied. In the Y-axis, the downward direction is the positive direction, and yb>ya is satisfied.

In the information 232 indicating the object selection condition illustrated in FIG. 6, "ENTIRE" is designated by a radio button. In this case, the information processing apparatus 1 executing the application sets the object selection condition when the operation of designating the range is performed to the first selection condition (that is, a selection condition for bringing objects entirely included in a designated range into a selected state, and bringing the other objects into an unselected state). For this reason, for example, in a case where a range SA is designated by dragging the mouse, the information processing apparatus 1 displays only the objects entirely included in the designated range SA as the objects in the selected state. For example, the information processing apparatus 1 determines whether or not the entire object is included in the designated range SA based on the coordinates (xa, ya) of the upper left Qa and the coordinates (xb, yb) of the lower right Qb of the designated range SA, and the upper left coordinates and the lower right coordinates (more specifically, the upper left coordinates and the lower right coordinates in the dashed-two dotted rectangle illustrated in FIG. 5) of the arranged object in the editing area 220 including the partial area 220P. Among the objects 240 to 243, 250, and 260 illustrated in FIG. 5, the objects each entirely included in the range SA illustrated in FIG. 6 are only the textual object 240 of "horizontal writing" and the textual object 243 of "123". Therefore, the information processing apparatus 1 displays, on the display 33, an editing screen 200 in which the textual object 240 of "horizontal writing" is displayed as 240a indicating as being in the selected state, and the textual object 243 of "123" is displayed as 243a indicating as being in the selected state. Each of the displays 240a and 243a illustrated in FIG. 6 indicates as being in the selected state by displaying, together with the object, a frame surrounding the object and handles (elements each indicated by "○" in FIG. 6) that can change the dimensions of the object.

In the information 232 indicating the object selection condition illustrated in FIG. 7, "PARTIAL" is designated by a radio button. In this case, the information processing apparatus 1 executing the application sets the object selection condition when the operation of designating the range is performed to the second selection condition (that is, a selection condition for bringing objects at least partially included in a designated range into a selected state, and bringing the other objects into an unselected state). For this reason, for example, in a case where the range SA is designated by dragging the mouse, the information processing apparatus 1 displays only the objects at least partially included in the designated range SA as the objects in the selected state. For example, the information processing apparatus 1 determines whether or not the object is at least partially included in the designated range SA based on the coordinates (xa, ya) of the upper left Qa and the coordinates (xb, yb) of the lower right Qb of the designated range SA, and the upper left coordinates and the lower right coordinates of the arranged object in the editing area 220 including the partial area 220P. All of the objects 240 to 243, 250, and 260 illustrated in FIG. 5 are objects each at least partially included in the range SA illustrated in FIG. 7. Therefore, the information processing apparatus 1 displays, on the display 33, the editing screen 200 in which the objects 240 to 243, 250, and 260 illustrated in FIG. 5 are respectively displayed as 240a to 243a, 250a, and 260a indicating as being in the selected state.

In a case where the object selection condition at the time of performing the operation of designating the range in the application is fixed to the second selection condition corresponding to "PARTIAL", it is difficult to select only two of the textual object 240 "horizontal writing" and the textual object 243 "123" illustrated in FIG. 5 by the operation of designating the range. Thus, for example, the user performs an operation of directly designating the textual object 240 "horizontal writing" and an operation of directly designating the textual object 243 "123" while pressing a predetermined key. On the other hand, in a case where the object selection condition when the operation of designating the range in the application is performed is fixed to the first selection condition corresponding to "ENTIRE", and in a case where all the objects 240 to 243, 250, and 260 illustrated in FIG. 5 are selected by the operation of designating the range, the designated range is widened. Thus, for example, the user could fail to designate a range due to the large amount of mouse movement when dragging the mouse, or fail to select an object because the edge of the object to be selected was outside the range designated by dragging the mouse.

In contrast, in the application according to the embodiment of the present disclosure, as described above, the user can designate which of the first selection condition and the second selection condition is to be used as the object selection condition when the operation of designating the range is performed, and switch between them as appropriate. Therefore, as compared with the application fixed to one of the first selection condition and the second selection condition, it is possible to suppress the burden on the user due to the operation of selecting the object.

Figure 8:
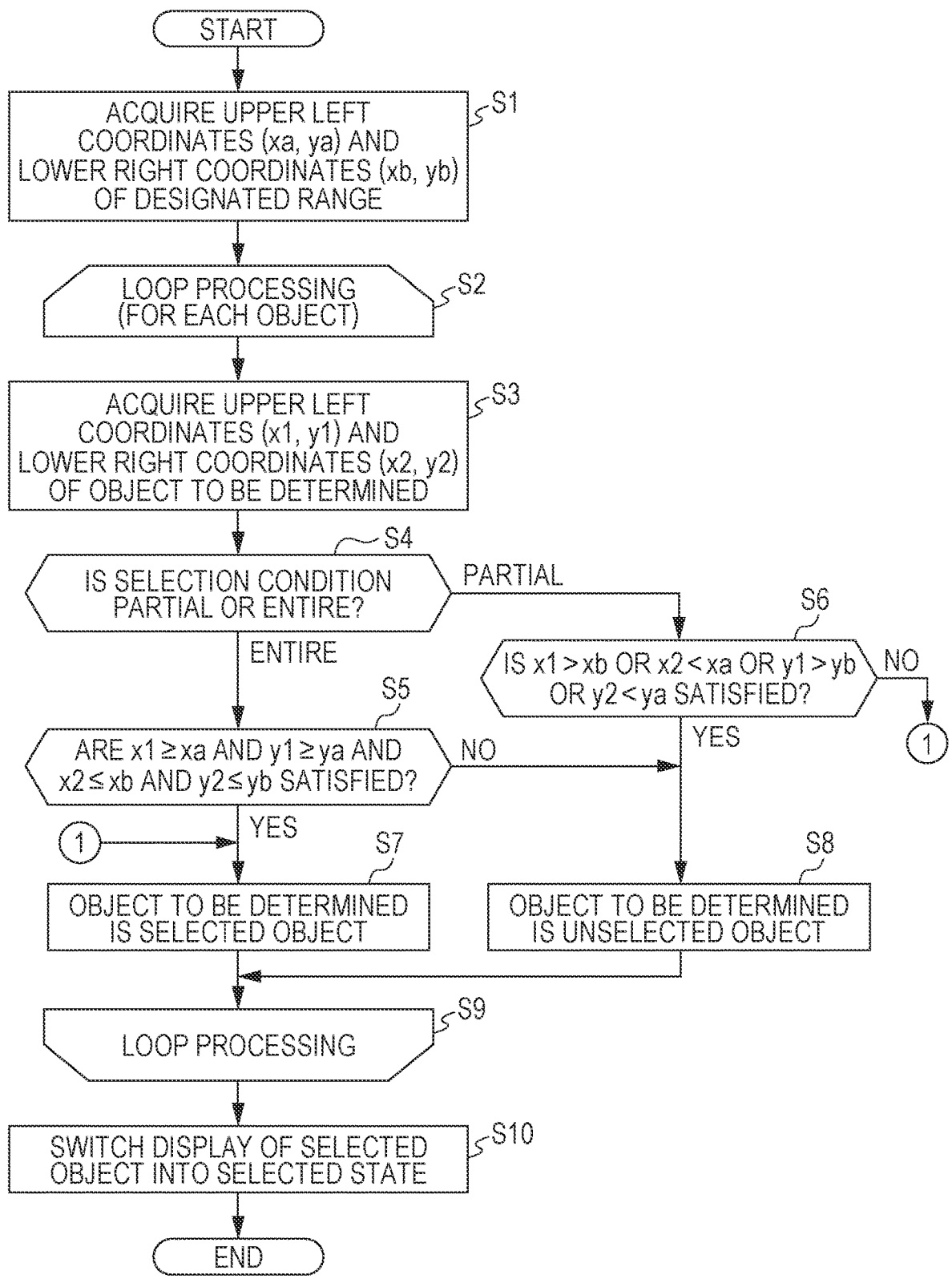
FIG. 8 is a flowchart illustrating a first example of processing related to object selection performed by the information processing apparatus.

FIG. 8 is a flowchart explaining a first example of processing related to object selection performed by the information processing apparatus. The flowchart of FIG. 8 provides an example of processing related to object selection described above with reference to FIGS. 5 to 7. The information processing apparatus 1 executing the application starts the processing exemplified in FIG. 8 when an operation of designating a range in the editing area 220 in which one or more objects are arranged is performed.

First, the information processing apparatus 1 acquires upper left coordinates (xa, ya) and lower right coordinates (xb, yb) of the designated range SA (step S1). In step S1, the information processing apparatus 1 acquires, for example, upper left coordinates (xa, ya) and lower right coordinates (xb, yb) of the range SA in a coordinate system set in the display area by known processing performed when a range in the display area of the display 33 is designated by operating a pointing device such as a mouse. The coordinate system set in the display area may be, for example, a coordinate system set in the editing area 220 of the editing screen 200. Thereafter, the information processing apparatus 1 performs loop processing of determining (steps S2 to S9), for each object arranged in the editing area 220 of the editing screen 200, whether it should be brought into a selected state or an unselected state, and switches the display of the object (selected object) that has been determined to be brought into the selected state to the display indicating as being in the selected state (step S10).

For example, the information processing apparatus 1 selects an object to be determined, at the starting point of the loop processing (step S2). Next, the information processing apparatus 1 acquires upper left coordinates (x1, y1) and lower right coordinates (x2, y2) of the object to be determined (step S3). In step S3, the information processing apparatus 1 acquires upper left coordinates (x1, y1) and lower right coordinates (x2, y2) of the object to be determined in the coordinate system in the display area corresponding to the upper left coordinates (xa, ya) and the lower right coordinates (xb, yb) of the range SA. The upper left coordinates (x1, y1) and the lower right coordinates (x2, y2) of the object are the upper left coordinates (x1, y1) and the lower right coordinates (x2, y2) in the dashed-two dotted rectangle indicating the shape and dimensions of the object illustrated in FIG. 5, etc.

Next, the information processing apparatus 1 determines whether the object selection condition is PARTIAL corresponding to the second determination condition or ENTIRE corresponding to the first determination condition (step S4).

In a case where the object selection condition is ENTIRE (step S4; ENTIRE), the information processing apparatus 1 determines whether or not x1≥xa and y1≥ya and x2≤xb and y2≤yb are satisfied (step S5). In step S5, it is sufficient if it can be determined whether or not the object to be determined is entirely included in the designated range SA. Therefore, the determination condition in step S5 is not limited to whether or not x1≥xa and y1≥ya and x2≤xb and y2≤yb are satisfied, and other determination conditions may be used. When the determination condition in step S5 is satisfied (step S5; YES), the information processing apparatus 1 determines that the object to be determined is an object (selected object) to be brought into a selected state (step S7). When the determination condition in step S5 is not satisfied (step S5; NO), the information processing apparatus 1 determines that the object to be determined is an object (unselected object) to be brought into an unselected state (step S8).

On the other hand, in a case where the object selection condition is PARTIAL (step S4; PARTIAL), the information processing apparatus 1 determines whether or not x1>xb or x2<xa or y1>yb or y2<ya is satisfied (step S6). When x1>xb or x2<xa or y1>yb or y2<ya is satisfied, the entire portion of the object to be determined is outside the range SA. In step S6, it is sufficient if it can be determined whether or not the object to be determined is at least partially included in the designated range SA. Therefore, the determination condition in step S6 is not limited to whether or not x1>xb or x2<xa or y1>yb or y2<ya is satisfied, and other determination conditions may be used. When the determination condition in step S6 is satisfied (step S6; YES), the information processing apparatus 1 determines that the object to be determined is an unselected object (step S8). When the determination condition in step S6 is not satisfied (step S6; NO), the information processing apparatus 1 determines that the object to be determined is a selected object (step S7).

After step S7 or S8, for example, at the end of the loop processing (step S9), the information processing apparatus 1 determines whether or not all the objects arranged in the editing area 220 are specified as a selected object or an unselected object. In a case where there remain any objects that have not been specified as the selected object or the unselected object, the information processing apparatus 1 continues the loop processing. When all the objects are specified as the selected object or the unselected object, the information processing apparatus 1 ends the loop processing, switches the display of selected object to the display indicating as being in the selected state (step S10), and ends the processing related to the object selection.

Note that the processing executed by the information processing apparatus 1 to implement the object selection method described above with reference to FIGS. 5 to 7 is not limited to the processing according to the flowchart illustrated in FIG. 8, and can be changed as appropriate.

Figure 9:
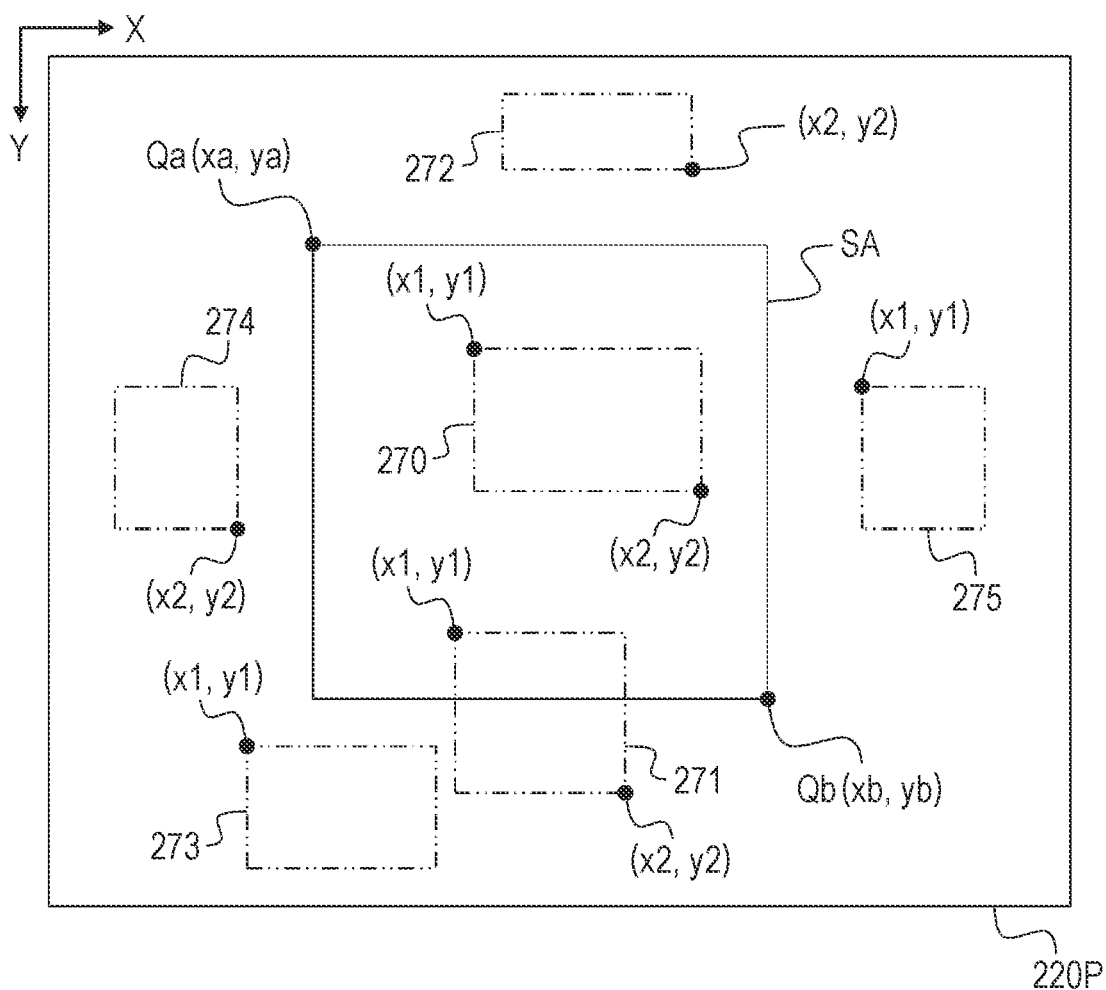
FIG. 9 is a diagram illustrating examples of selected objects and unselected objects in a first example of processing related to object selection.

FIG. 9 is a diagram illustrating examples of the selected objects and the unselected objects in the first example of processing related to object selection. Each of the six dashed-two dotted rectangles 270 to 275 illustrated in FIG. 9 indicates the outer shape of an object arranged in the partial area 220P (editing area 220). The XY orthogonal coordinate system in FIG. 9 is a coordinate system to be set in the display area of the display 33 (or the editing area 220 of the editing screen 200). In the X axis, the rightward direction is the positive direction, and xb>xa is satisfied. In the Y-axis, the downward direction is the positive direction, and yb>ya is satisfied.

When the user performs an operation of designating the range SA, the user generally performs an operation of setting the upper left Qa of the range SA as a start point and the lower right Qb as an end point. However, the operation of designating the range SA is not limited to such an operation, and may be, for example, an operation of setting the upper right of the range SA as the starting point and the lower left as the end point. The position and dimensions of the object each arranged in the partial area 220P (editing area 220) are represented by upper left coordinates (x1, y1) and lower right coordinates (x2, y2) in a dashed-two dotted rectangle indicating the outer shape of the object. Therefore, when it is determined whether the object is a selected object or an unselected object in response to the operation of designating the range SA being performed, the designated range SA is represented by coordinates (xa, ya) of the upper left Qa and coordinates (xb, yb) of the lower right Qb. In this way, the degree of overlap between the object to be determined and the range SA can be determined based on the coordinates (xa, ya) of the upper left Qa and the coordinates (xb, yb) of the lower right Qb of the range SA, and the upper left coordinates (x1, y1) and the lower right coordinates (x2, y2) of the object to be determined.

In the determination in step S5 described with referent to FIG. 8, it is determined whether or not the object to be determined is entirely included in the designated range SA. In a case where an object is entirely included in the range SA like the object 270 illustrated in FIG. 9, x1>xa and y1>ya and x2<xb and y2<yb are satisfied. In addition, the object having the largest dimensions among the objects each entirely included in the range SA is an object of (x1, y1)=(xa, ya) and (x2, y2)=(xb, yb). Therefore, the object entirely included in the designated range SA satisfies x1≥xa and y1≥ya and x2≤xb and y2≤yb. Therefore, in a case where the object selection condition is ENTIRE corresponding to the first selection condition described above with reference to FIG. 8, an object that satisfies x1≥xa and y1≥ya and x2≤xb and y2≤yb is an object to be brought into a selected state. At this time, since the objects 271 to 275 illustrated in FIG. 9 each do not satisfy x1≥xa and y1≥ya and x2≤xb and y2≤yb (that is, at least a portion thereof exists outside the range SA), thus are the objects to be set to the unselected state.

On the other hand, in the determination in step S6 described with referent to FIG. 8, it is determined whether or not the object to be determined is at least partially included in the designated range SA. Such determination can be efficiently performed under a simple determination condition by being replaced with, for example, determination on whether or not the entire object to be determined is located outside the range SA. For example, in the object 272 located above the range SA, the coordinate y2 indicating the position of the lower side closest to the range SA satisfies y2<ya. In the object 273 located below the range SA, the coordinate y1 indicating the position of the upper side closest to the range SA satisfies y1>yb. In the object 274 located on the left of the range SA, the coordinate x2 indicating the position of the right side closest to the range SA satisfies x2<xa. In the object 275 located on the right of the range SA, the coordinate x1 indicating the position of the left side closest to the range SA satisfies x1>xb. Therefore, an object satisfying x1>xb or x2<xa or y1>yb or y2<ya is an object entirely existing outside the range SA as described above. In other words, an object that does not satisfy x1>xb or x2<xa or y1>yb, or y2<ya is an object that is at least partially included in the range SA. For example, in a case where the selection condition is PARTIAL (second selection condition), the objects 270 and 271 illustrated in FIG. 9 do not satisfy x1>xb or x2<xa or y1>yb or y2<ya (that is, at least partly included in the range SA), and thus are objects to be brought into a selected state.

As described above, the user of the information processing apparatus 1 executing the application according to the embodiment of the present disclosure can select and switch the selection condition for specifying the object to be brought into a selected state when the operation of designating the range SA in the editing area 220 is performed, from the first selection condition for bringing objects entirely included in the range SA into a selected state and the second selection condition for bringing objects at least partially included in the range SA into a selected state. Therefore, it is possible to suppress the burden on the user in the processing of selecting an object as compared with the case where the selection condition is fixed.

Figure 10:
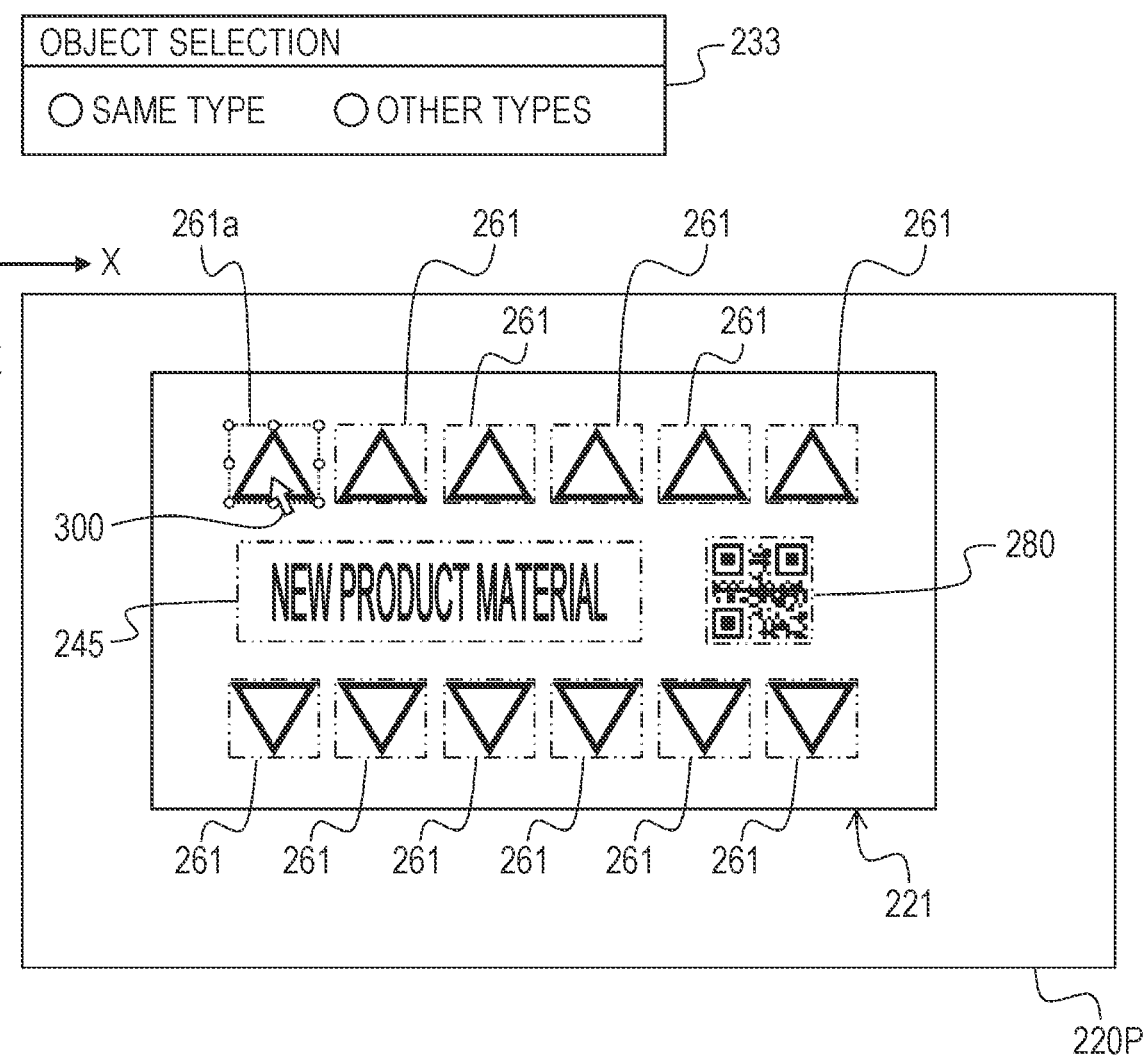
FIG. 10 is a diagram illustrating a second example of a selection condition and a second example of a plurality of objects arranged in the editing screen.

FIG. 10 is a diagram illustrating a second example of the selection condition and a second example of a plurality of objects arranged in the editing screen. FIG. 10 illustrates information 233 indicating the second example of the selection condition and a partial area 220P of the editing area 220 of the editing screen 200. The XY orthogonal coordinate system in FIG. 10 is a coordinate system to be set in the display area of the display 33 (or the editing area 220 of the editing screen 200). In the X axis, a rightward direction is a positive direction, and in the Y axis, a downward direction is a positive direction.

The object selection method described with reference to FIG. 10 is a method of starting an operation of designating a range in the editing area 220 in a state where at least one object arranged in the editing area 220 is selected. FIG. 10 illustrates one textual object 245, one graphical object 280 of a third type, and twelve graphical objects 261 of a second type as examples of a plurality of objects arranged in the partial area 220P (editing area 220). The graphical object 280 is a QR code (registered trademark). One graphical object 261 positioned at the upper left among the twelve graphical objects 261 is selected by the user's operation, and is displayed as the display 261a indicating as being in the selected state. The dashed-two dotted rectangles surrounding the other objects 245, 280, and 261 are not displayed on the display 33 as described above with reference to FIG. 5.

The information 233 indicating the second example of the selection condition is displayed, for example, in the auxiliary information area 230 or the like of the editing screen 200 in the same way as the information 232 described above. The information 233 indicates the type of objects to be brought into a selected state based on a range SA designated by an operation of designating the range performed in a state where at least one object is selected, as one of a third selection condition for setting the objects to be same in type as the object selected at the start of the operation of designating the range and a fourth selection condition for setting the objects to be different in type. In addition, the information 233 is configured such that the user can designate and appropriately change which of the third selection condition and the fourth selection condition is used to select the objects. Note that the operation of designating a range performed in a state where the object is selected includes an operation of designating a range to be started in a state where the object is selected. In other words, in a case where the operation of designating the range is started in a state where the object is selected, the display of the object in a state of being selected at the start while the operation is being performed may remain as the display indicating as being in the selected state or may be changed to the display indicating as being in the unselected state.

FIG. 11 is a diagram illustrating an example of displaying objects when a range is designated by setting a selection condition to the SAME TYPE. FIG. 12 is a diagram illustrating an example of displaying objects when a range is designated by setting a selection condition to OTHER TYPES. FIGS. 11 and 12 each illustrate an example of displaying objects when an operation of designating a range in the partial area 220P in which the objects 245, 280, and 261 illustrated in FIG. 10 are arranged is performed. The XY orthogonal coordinate system in FIGS. 11 and 12 is a coordinate system set in the display area of the display 33 (or the editing area 220 of the editing screen 200). In the X axis, the rightward direction is the positive direction, and xb>xa is satisfied. In the Y-axis, the downward direction is the positive direction, and yb>ya is satisfied. Note that, in FIGS. 11 and 12, some of the dashed-two dotted rectangles indicating the shape and dimensions of the object are omitted.

In the information 233 indicating the object selection condition illustrated in FIG. 11, "SAME TYPE" is designated by a radio button. In this case, the information processing apparatus 1 executing the application sets the object selection condition when the operation of designating the range is performed to the third selection condition (that is, a selection condition for bringing objects same in type as the object in the selected state when the operation of designating the range is performed into a selected state). For example, when the operation of designating the range is started in a state where the triangular object 261 is selected as illustrated in FIG. 10, the object 261 is changed to the unselected state display as illustrated in the upper partial area 220P of the two partial areas 220P of FIG. 11, and a rectangle indicating a designated range SA' is displayed. Thereafter, when the operation of designating the range is completed, the information processing apparatus 1 brings all the triangular objects 261 included in the range designated by the completed operation into a selected state. For example, when the range SA including all of the twelve triangular objects 261 in FIG. 11 is designated, the information processing apparatus 1 displays, on the display 33, the editing screen 200 in which all of the twelve triangular objects 261 in the range SA are changed to the displays 261a indicating as being in the selected state as illustrated in the lower partial area 220P of the two partial areas 220P in FIG. 11. At this time, the information processing apparatus 1 does not bring the textual object 245 and the QR code object 280 included in the designated range SA and arranged between the upper set of six triangular objects 261 and the lower set of six triangular objects 261, into a selected state. That is, the user can easily select only the triangular objects 261 by the operation of designating the range.

In the information 233 indicating the object selection condition illustrated in FIG. 12, "OTHER TYPES" is designated by a radio button. In this case, the information processing apparatus 1 executing the application sets the object selection condition when the operation of designating the range is performed as the fourth selection condition (that is, a selection condition for bringing objects different in type from the object in the selected state when the operation of designating the range is performed into a selected state). For example, as illustrated in the upper partial area 220P of the two partial areas 220P in FIG. 12, in a case where one of the triangular objects 261 is selected, the information processing apparatus 1 determines the textual object 245 and the QR code object 280 as objects different in type from the triangular object 261. Therefore, when the operation of designating the range is started in the state where the triangular object 261 is selected and thus the range SA designated by the operation is defined, for example, as illustrated in the lower partial area 220P of the two partial areas 220P in FIG. 12, among the objects 245, 280, and 261 included in the range SA, the objects 245 and 280 excluding the triangular objects 261 are changed to displays 245a and 280a indicating that the objects 245 and 280 are in the selected state.

Figure 13:
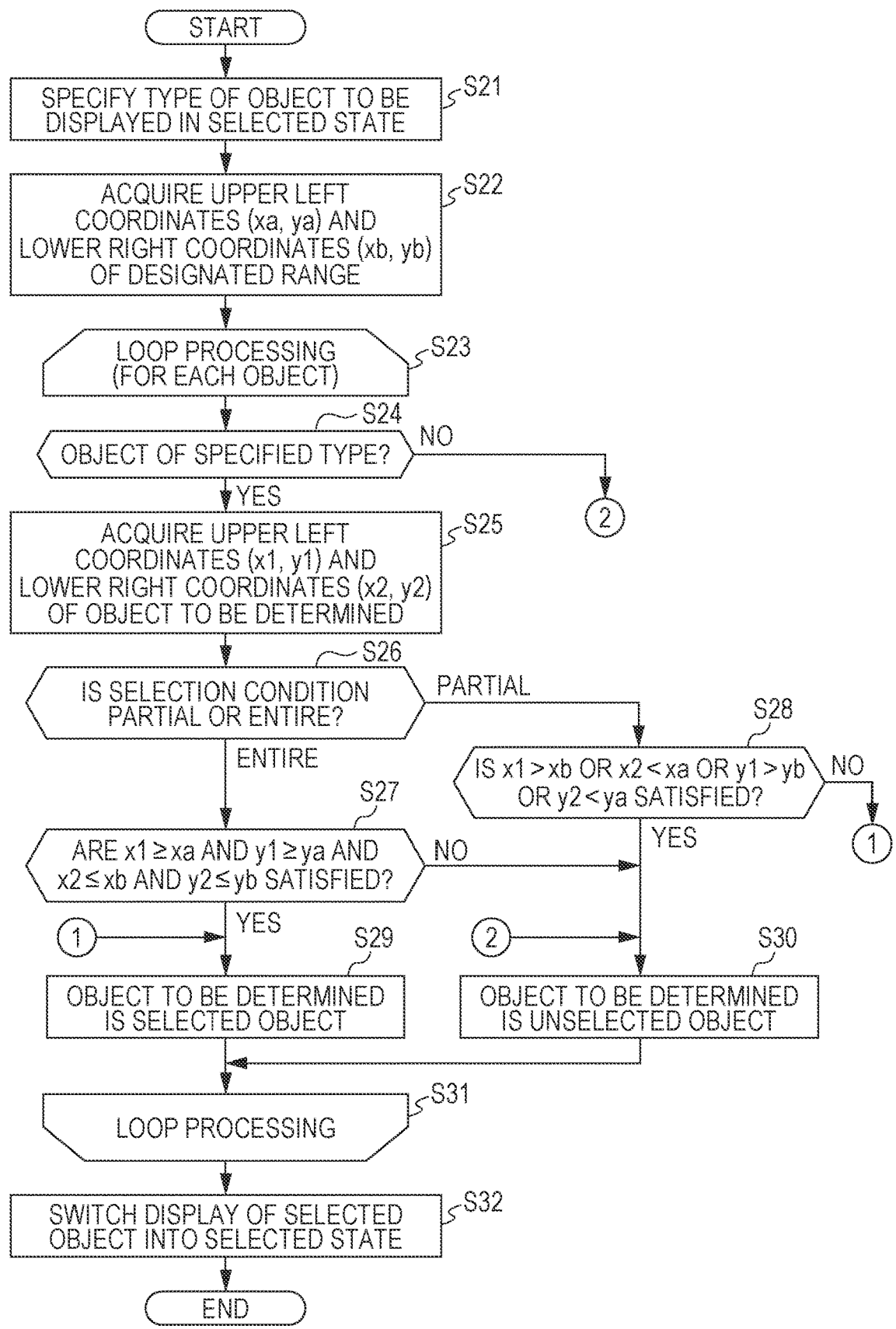
FIG. 13 is a flowchart illustrating a second example of processing related to object selection performed by the information processing apparatus.

FIG. 13 is a flowchart explaining a second example of processing related to object selection performed by the information processing apparatus. The flowchart of FIG. 13 provides an example of processing related to object selection described above with reference to FIGS. 10 to 12. The information processing apparatus 1 executing the application starts the processing exemplified in FIG. 13 when an operation of designating a range started in a state where an object arranged in the editing area 220 is selected is completed.

First, the information processing apparatus 1 specifies the type of object to be displayed in the selected state (step S21), and acquires the upper left coordinates (xa, ya) and the lower right coordinates (xb, yb) of the designated range SA (step S22). In step S21, for example, the information processing apparatus 1 specifies the type of the object to be displayed in the selected state based on the type of the object that is in the selected state when the operation of designating the range is started and the object selection condition designated in the information 233 described above with reference to FIGS. 10 to 12. In step S22, the information processing apparatus 1 acquires, for example, upper left coordinates (xa, ya) and lower right coordinates (xb, yb) of the range SA in a coordinate system set in the display area by known processing performed when a range in the display area of the display 33 is designated by operating a pointing device such as a mouse. The coordinate system set in the display area may be, for example, a coordinate system set in the editing area 220 of the editing screen 200. The processing in steps S21 and S22 is not limited to this order, and may be performed in the reverse order or in parallel.

After steps S21 and S22, the information processing apparatus 1 performs loop processing of determining (steps S23 to S31), for each object arranged in the editing area 220 of the editing screen 200, whether it should be brought into a selected state or an unselected state, and switches the display of the object (selected object) determined to be brought into a selected state to the display indicating as being in the selected state (step S32).

For example, the information processing apparatus 1 selects an object to be determined at the starting point of the loop processing (step S23). Next, the information processing apparatus 1 determines whether or not the object to be determined is an object of the type specified in step S21 (step S24). When the object to be determined is an object of the specified type (step S24; YES), the information processing apparatus 1 performs, for example, processing (steps S25 to S30) corresponding to steps S3 to S8 in the processing described above with reference to FIG. 8. In a case where a selection condition (first selection condition) for bringing only the objects entirely included in the range SA into a selected state is designated (step S26; ENTIRE), the information processing apparatus 1 sets objects that satisfy x1≥xa and y1≥ya and x2≤xb and y2≤yb as selected objects to be displayed in a selected state (step S29), and sets objects that do not satisfy these conditions as unselected objects to be displayed in an unselected state (step S30). In a case where a selection condition (second selection condition) for bringing the objects at least partially included in the range SA into a selected state is designated (step S26; PARTIAL), the information processing apparatus 1 sets objects that do not satisfy x1>xb or x2<xa or y1>yb or y2<ya as selected objects (step S29), and sets the objects that satisfy these conditions as unselected objects (step S30).

On the other hand, when it is determined in step S24 that the object to be determined is not an object of the specified type (step S24; YES), the information processing apparatus 1 sets the object to be determined as an unselected object (step S30).

After step S29 or S30, for example, at the end of the loop processing (step S31), the information processing apparatus 1 determines whether or not all the objects arranged in the editing area 220 are specified as a selected object or an unselected object. In a case where there remain any objects that have not been specified as the selected object or the unselected object, the information processing apparatus 1 continues the loop processing. When all the objects are specified as a selected object or an unselected object, the information processing apparatus 1 ends the loop processing, switches the display of the selected objects to the display indicating as being in the selected state (step S32), and ends the processing related to the object selection.

Note that the processing executed by the information processing apparatus 1 to implement the object selection method described above with reference to FIGS. 10 to 12 is not limited to the processing according to the flowchart illustrated in FIG. 13, and can be changed as appropriate.

FIG. 14 is a diagram illustrating a third example of a selection condition and an example of displaying objects when a range is designated. FIG. 14 illustrates information 234 indicating the third example of the selection condition and a partial area 220P of the editing area 220 of the editing screen 200. The XY orthogonal coordinate system in FIG. 14 is a coordinate system to be set in the display area of the display 33 (or the editing area 220 of the editing screen 200). In the X axis, a rightward direction is a positive direction, and in the Y axis, a downward direction is a positive direction. In addition, in FIG. 14, some of the dashed-two dotted rectangles indicating the shape and dimensions of the object are omitted.

The object selection method described with reference to FIG. 14 is another example of the selection method when an operation of designating a range in the editing area 220 is performed (started) in a state where at least one object arranged in the editing area 220 is selected. FIG. 14 illustrates two textual objects 245 and 246, and twelve graphical (triangular) objects 261 as examples of a plurality of objects arranged in the partial area 220P (editing area 220). In the upper partial area 220P of the two partial areas 220P, an object 245 "new product material" among the two textual objects is selected by the user's operation, and displayed as the display 245a indicating as being in the selected state. The dashed-two dotted rectangles surrounding the other objects 246 and 261 are not displayed on the display 33 as described above with reference to FIG. 5.

The information 234 indicating the third example of the selection condition is displayed, for example, in the auxiliary information area 230 or the like of the editing screen 200 in the same way such as the information 232 and 233 and the like described above. The information 234 indicates the selection condition for bringing objects into a selected state based on a range SA designated by the operation of designating the range performed in the state where at least one object is selected, as one of a fifth selection condition for bringing all the objects other than the object selected when the operation of designating the range is performed into a selected state and a sixth selection condition for bringing the objects other than and different in type from the object selected when the operation of designating the range is performed into a selected state. In addition, the information 234 is configured such that the user can designate and appropriately change which of the fifth selection condition and the sixth selection condition is used to select the objects.

In the information 234 illustrated in FIG. 14, "OTHER THAN DESIGNATED OBJECT (ALL TYPES)" is designated by a radio button. In this case, the information processing apparatus 1 executing the application sets the object selection condition when the operation of designating the range is performed to the fifth selection condition (that is, a selection condition for bringing all objects other than the object in the selected state when the operation of designating the range is performed into a selected state). For example, when an operation of designating a range is performed (started) in a state where the textual object 245 is selected as illustrated in FIG. 14 and the range SA is designated, as illustrated in the lower partial area 220P of the two partial areas 220P of FIG. 14, the object 245 selected at the start of the operation of designating the range is brought into the unselected state, and the editing screen 200 in which the other objects 246 and 261 in the range SA are changed to the displays 246a and 261a indicating as being in the selected state is displayed on the display 33.

Furthermore, although the description with reference to the drawings is omitted, in a case where "OTHER THAN DESIGNATED OBJECT (OTHER TYPES)" is designated by the radio button in the information 234 illustrated in FIG. 14, the information processing apparatus 1 executing the application sets the object selection condition when the operation of designating the range is performed to the sixth selection condition (that is, a selection condition for setting objects other than and different in type from the object selected when the operation of designating the range is performed as the objects in the selected state). In this case, for example, when the range SA as illustrated in FIG. 14 is designated, the object 245 selected at the start of the operation of designating the range is brought into the unselected state, and the editing screen 200 in which the object 261 in the range SA whose type is other than textual type is changed to the object display 261a indicating as being in the selected state is displayed on the display 33.

FIG. 15 is a diagram illustrating another example of a method of displaying objects when an operation of designating a range is performed. FIG. 15 illustrates another example of a method of displaying objects described with reference to FIGS. 10 to 12.

In the processing of selecting objects illustrated in FIGS. 10 to 12, each object is displayed as an unselected object while an operation of designating a range is performed. For this reason, for example, it is difficult to recognize the type of the object to be selected on the display screen displayed on the display 33 while the operation of designating the range is performed. In order to improve such difficulty in recognizing the type of the object to be selected, for example, as illustrated in FIG. 15, the color of the object of the type other than the type specified as the selection target may be lightened while the operation of designating the range is performed. In FIG. 15, an operation of designating a range is performed (started) in a state where the graphical (triangular) object 261 is selected, and the "SAME TYPE" is designated in the information 233 indicating the object selection condition. In this case, while the operation of designating the range is performed, the information processing apparatus 1 displays the textual object 245 and the QR code 280 different in type from the triangular object 261 by changing them to light-colored displays 245b and 280b indicating that the objects are not selection targets. As a result, the user can easily grasp the type of the object to be selected even while the operation of designating the range is performed.

Figure 16:
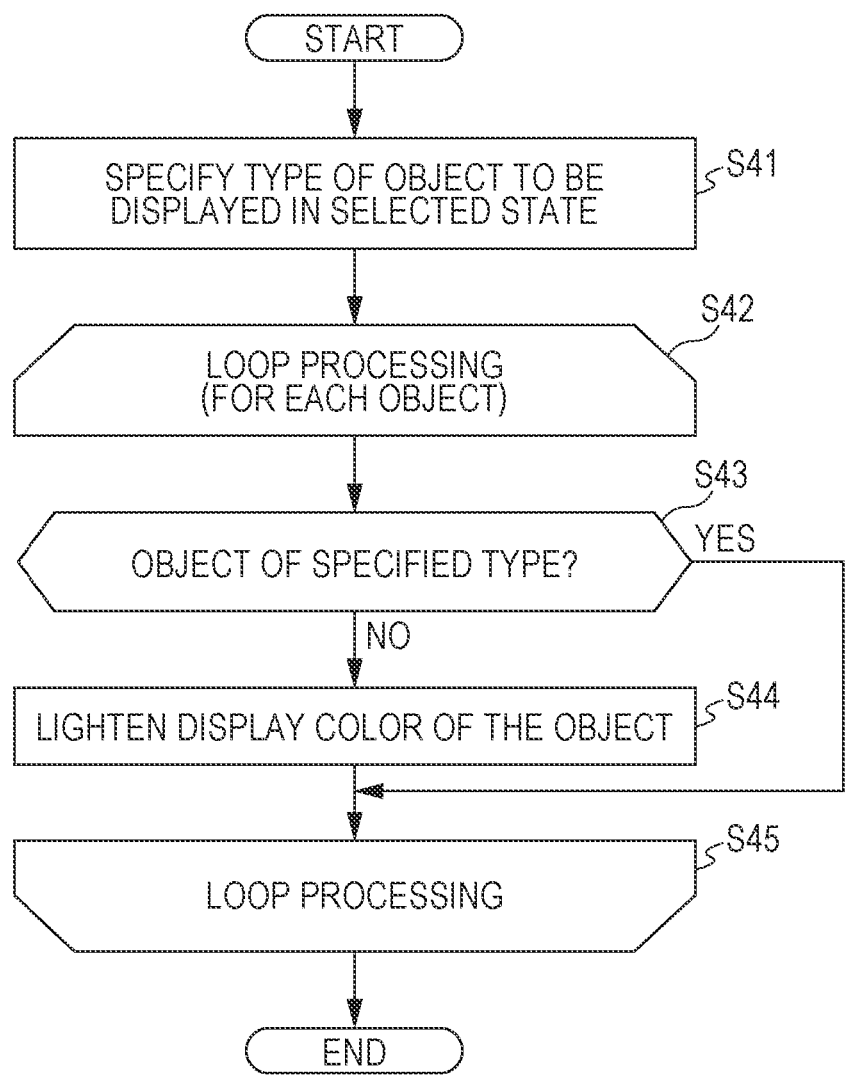
FIG. 16 is a flowchart illustrating an example of processing related to displaying objects performed by the information processing apparatus while an operation of designating a range is performed.

FIG. 16 is a flowchart explaining an example of processing related to displaying objects performed by the information processing apparatus while an operation of selecting a range is performed. The processing according to the flowchart of FIG. 16 is performed in parallel with, for example, an operation of designating a range in the editing area 220 performed before the processing according to the flowchart illustrated in FIG. 13 is started. More specifically, when an operation of designating a range in the editing area 220 is started in a state where the object arranged in the editing area 220 is selected, the information processing apparatus 1 starts the processing according to the flowchart of FIG. 16.

First, the information processing apparatus 1 specifies the type of object to be displayed in the selected state (step S41). In step S41, for example, the information processing apparatus 1 specifies the type of the object to be displayed in the selected state based on the type of the object being selected when the operation of designating the range is started and the object selection condition designated in the information 233 described above with reference to FIGS. 10 to 12. Thereafter, the information processing apparatus 1 determines, for each object arranged in the editing area 220 of the editing screen 200, whether or not the object is of the type specified in step S41, and performs loop processing (steps S42 to S45) of lightening the display color of the object of the specified type.

For example, the information processing apparatus 1 selects an object to be determined at the starting point of the loop processing (step S42). Next, the information processing apparatus 1 determines whether or not the object to be determined is an object of the type specified in step S41 (step S43). When the object to be determined is not an object of the specified type (step S43; NO), for example, the information processing apparatus 1 lightens the display color of the object to be determined (step S44). Thereafter, for example, at the end of the loop processing (step S45), the information processing apparatus 1 determines whether or not all the objects arranged in the editing area 220 are of the type specified in step S41. In a case where there remains an object that has not been determined whether or not it is of the type specified in step S41, the information processing apparatus 1 continues the loop processing. When it is determined whether or not all the objects are of the type specified in step S41, the information processing apparatus 1 ends the loop processing, and ends the processing related to displaying objects while the operation of designating the range is performed.

Note that the processing to be executed by the information processing apparatus 1 to implement displaying objects described above with reference to FIG. 15 is not limited to the processing according to the flowchart illustrated in FIG. 16, and can be changed as appropriate. For example, displaying objects described above with reference to FIGS. 15 and 16 may be, for example, processing of displaying, on the display 33, the object that can be in the selected state so as to be relatively emphasized as compared with the object (unselected object) that is not the selection target, based on the selection condition selected (designated) by the user and the type of the object selected at the start of the operation of designating the range.

Figure 17:
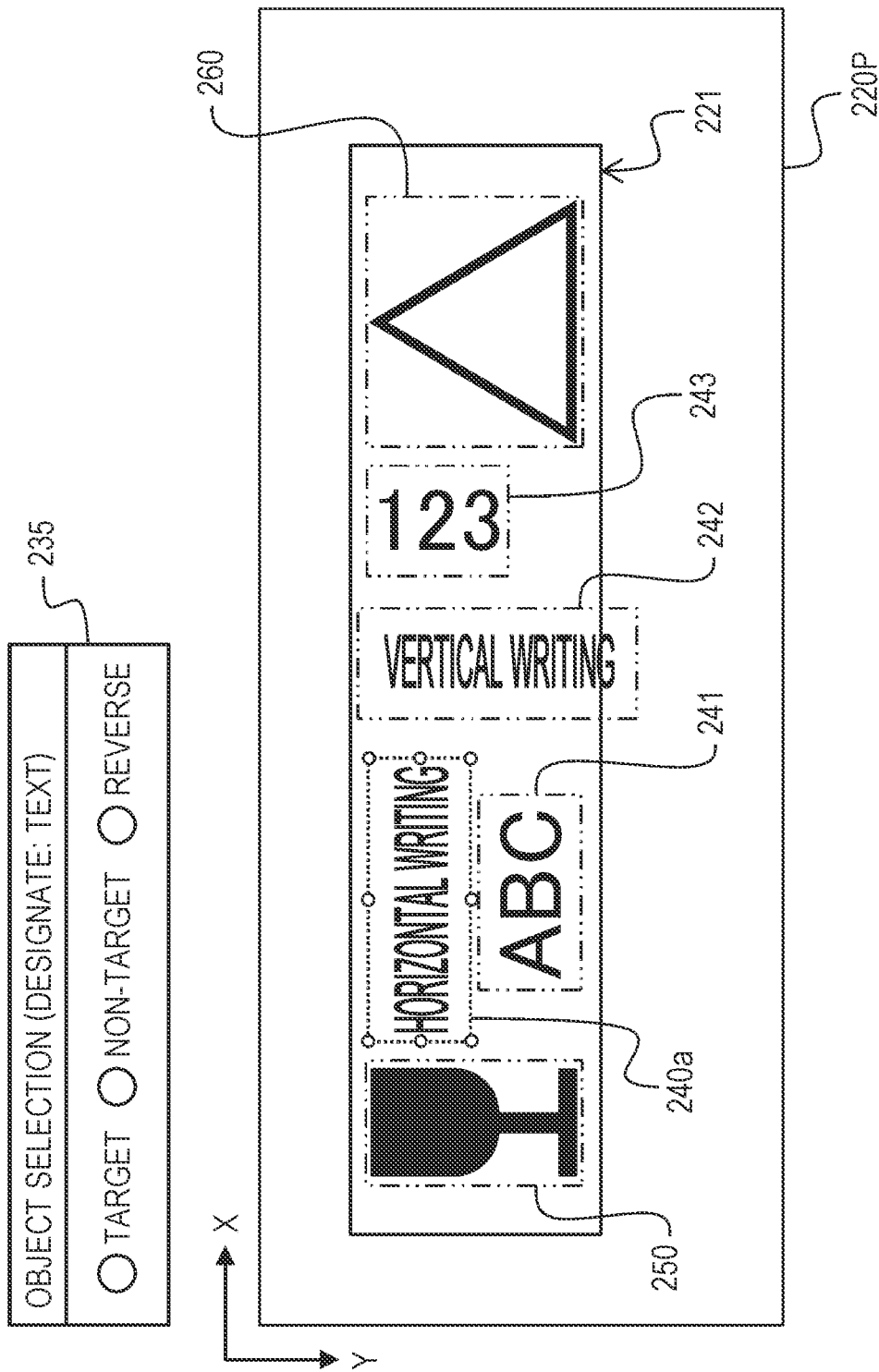
FIG. 17 is a diagram illustrating a fourth example of a selection condition and the first example of a plurality of objects arranged in the editing screen.

FIG. 17 is a diagram illustrating a fourth example of a selection condition and the first example of a plurality of objects arranged in the editing screen. FIG. 17 illustrates information 235 indicating the fourth example of the selection condition and a partial area 220P of the editing area 220 of the editing screen 200. The partial area 220P in FIG. 17 corresponds to the partial area 220P illustrated in FIG. 5. The XY orthogonal coordinate system in FIG. 17 is a coordinate system to be set in the display area of the display 33 (or the editing area 220 of the editing screen 200). In the X axis, a rightward direction is a positive direction, and in the Y axis, a downward direction is a positive direction.

The object selection method described with reference to FIG. 17 is an example of a method of changing the object selection condition by an operation different from an operation of directly designating an object and an operation of designating a range when at least one object arranged in the editing area 220 is in a selected state. FIG. 17 illustrates four textual objects 240 to 243, one graphical object 250 of a first type, and one graphical object 260 of a second type as examples of a plurality of objects arranged in the partial area 220P (editing area 220). The textual object "horizontal writing" among the four textual objects 240 to 243 is in a state of being selected by the user, and has been changed to the display 240a indicating as being in the selected state. The dashed-two dotted rectangles surrounding the other objects 241 to 243, 250, and 260 are not displayed on the display 33 as described above with reference to FIG. 5.

The information 235 indicating the fourth example of the selection condition is displayed, for example, in the auxiliary information area 230 or the like of the editing screen 200 in the same way such as the information 232 and 233 and the like described above. The information 235 indicates whether the object selection condition is a seventh selection condition for bringing all objects same in type as the object being selected into a selected state, an eighth selection condition for bringing all objects different in type from the object being selected into a selected state, or a ninth selection condition for bringing all objects different from the object being selected into a selected state. In addition, the information 235 is configured such that the user can designate and appropriately change which of the seventh selection condition, the eighth selection condition, and ninth selection condition is used to select the objects.

Figure 18:
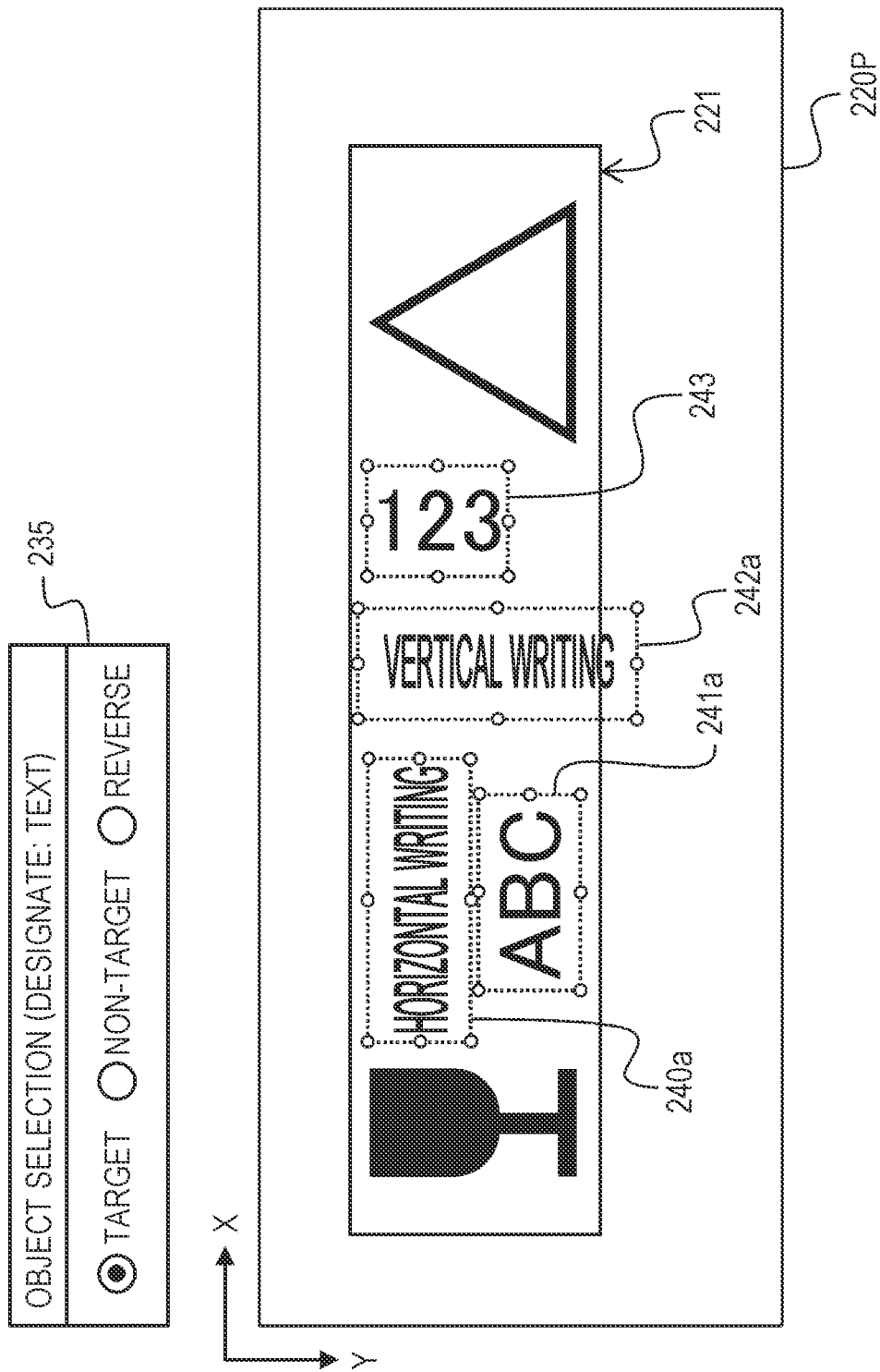
FIG. 18 is a diagram illustrating an example of displaying objects when a selection condition is set to TARGET.
Figure 19:
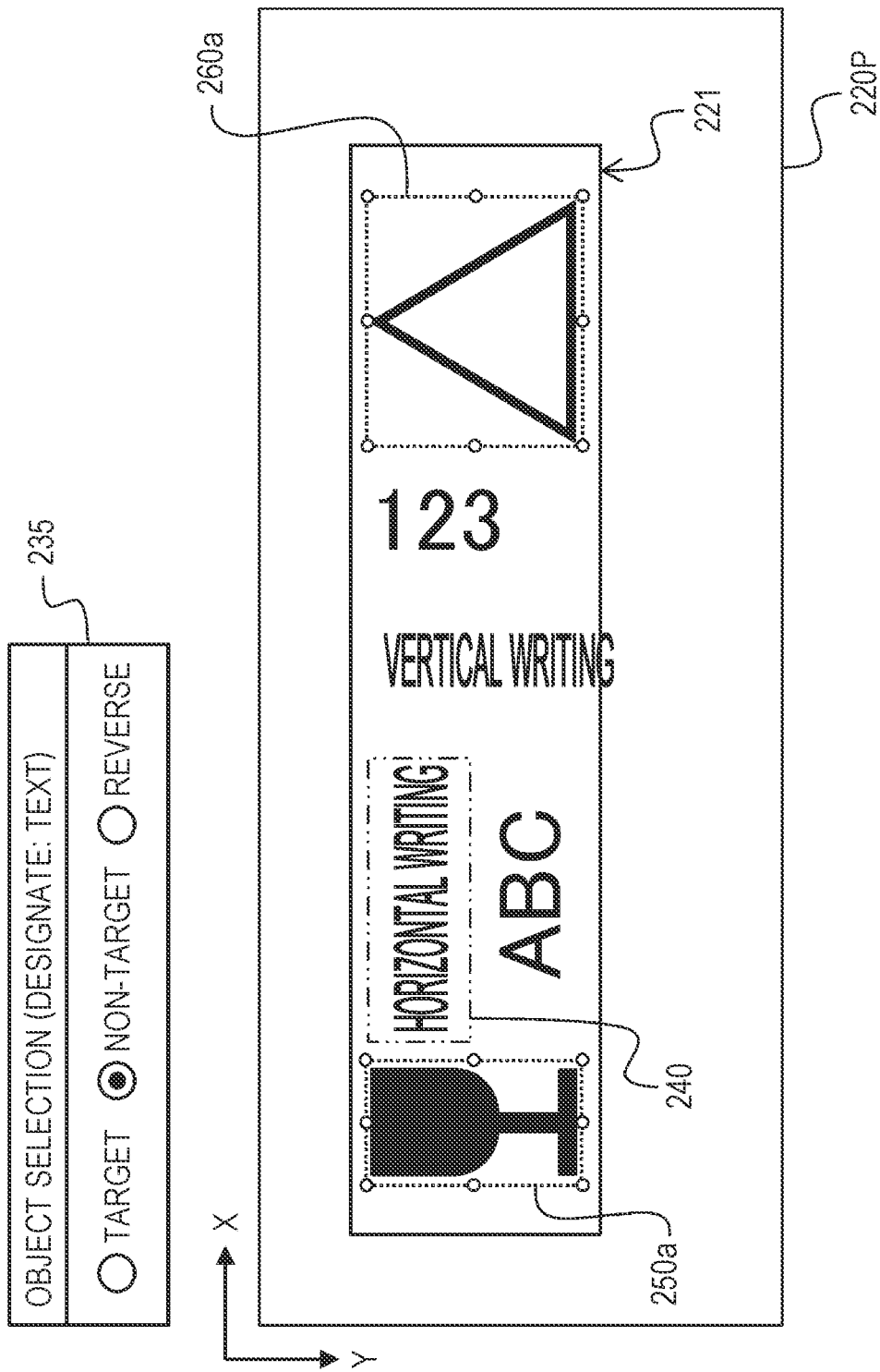
FIG. 19 is a diagram illustrating an example of displaying objects when a selection condition is set to NON-TARGET.
Figure 20:
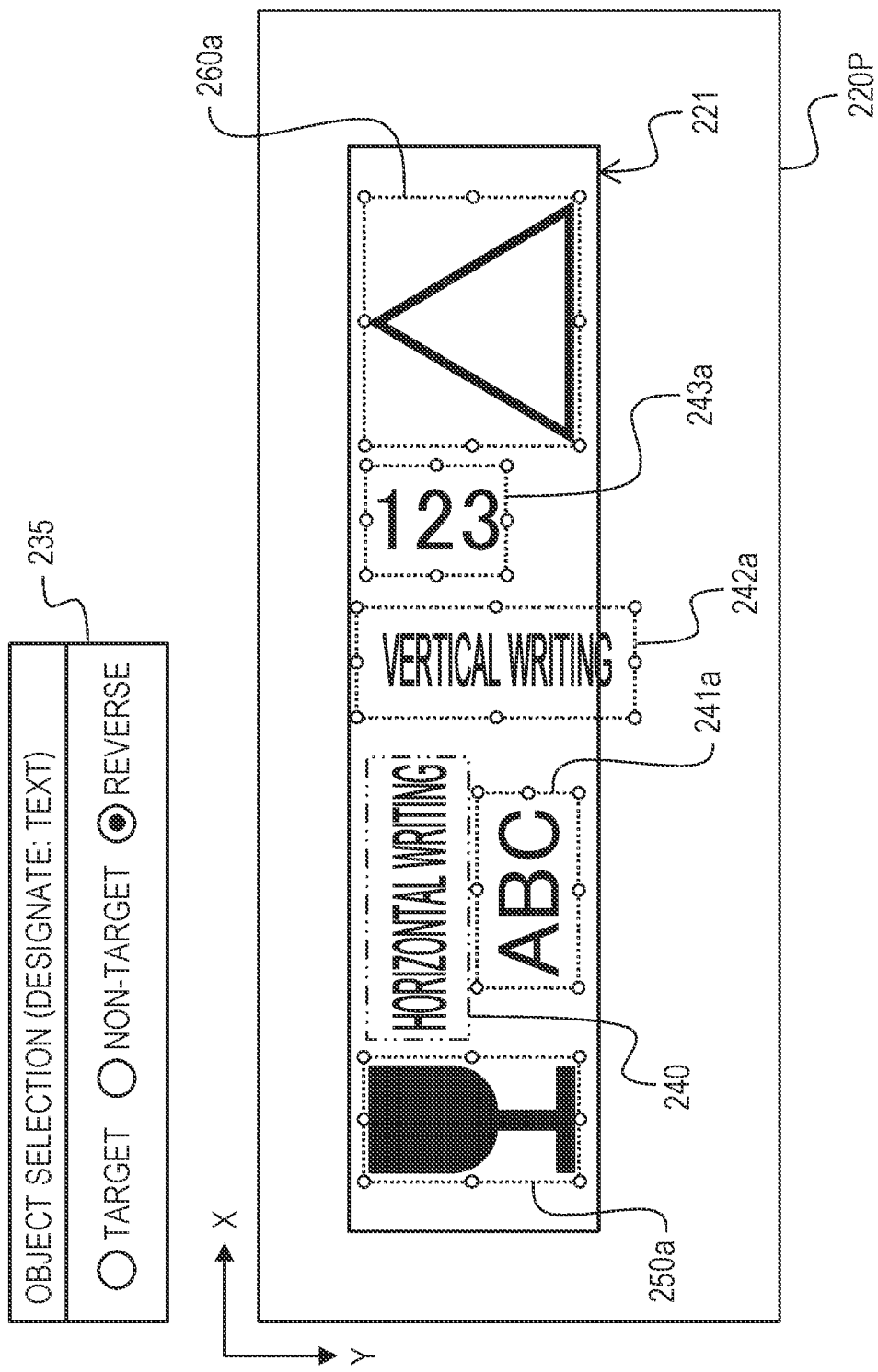
FIG. 20 is a diagram illustrating an example of displaying objects when a selection condition is set to REVERSE.

FIG. 18 is a diagram illustrating an example of displaying objects when a selection condition is set to TARGET. FIG. 19 is a diagram illustrating an example of displaying objects when a selection condition is set to NON-TARGET. FIG. 20 is a diagram illustrating an example of displaying objects when a selection condition is set to REVERSE. The XY orthogonal coordinate system in FIGS. 18-20 is a coordinate system to be set in the display area of the display 33 (or the editing area 220 of the editing screen 200). In the X axis, a rightward direction is a positive direction, and in the Y axis, a downward direction is a positive direction. In addition, in FIGS. 18 to 20, some of the dashed-two dotted rectangles indicating the shape and dimensions of the object are omitted.

In the information 235 illustrated in FIG. 18, "TARGET" is designated by a radio button. In this case, the information processing apparatus 1 executing the application displays all the objects same in type as the object being selected when the operation of designating "TARGET" is performed based on the seventh selection condition to indicate as being in the selected state. When an operation of designating "TARGET" is performed while the textual object 240 is selected (the display 240a indicating as being in the selected state is displayed) as illustrated in FIG. 17, the information processing apparatus 1 displays all the textual objects 240 to 243 among the objects arranged in the editing area 220 as the displays 240a to 243a indicating as being in the selected state, as illustrated in FIG. 18.

In the information 235 illustrated in FIG. 19, "NON-TARGET" is designated by a radio button. In this case, based on the eighth selection condition, the information processing apparatus 1 executing the application displays all the objects different in type from the object being selected when the operation of designating "NON-TARGET" is performed to indicate as being in the selected state. When the operation of designating "NON-TARGET" is performed while the textual object 240 is selected as illustrated in FIG. 17, the information processing apparatus 1 displays graphical objects 250 and 260 among the objects arranged in the editing area 220 as the displays 250a to 260a to indicate as being in the selected state, as illustrated in FIG. 19.

In the information 235 illustrated in FIG. 20, "REVERSE" is designated by a radio button. In this case, based on the ninth selection condition, the information processing apparatus 1 executing the application displays all the objects other than the object selected when the operation of designating "REVERSE" is performed, to indicate as being in the selected state. When the operation of designating "REVERSE" is performed while the textual object 240 is selected as illustrated in FIG. 17, the information processing apparatus 1 displays all the objects 241 to 243, 250 and 260 other than the textual object 240 among the objects arranged in the editing area 220 as the displays 241a to 243a, 250a, and 260a indicating as being in the selected state, as illustrated in FIG. 20.

Figure 21:
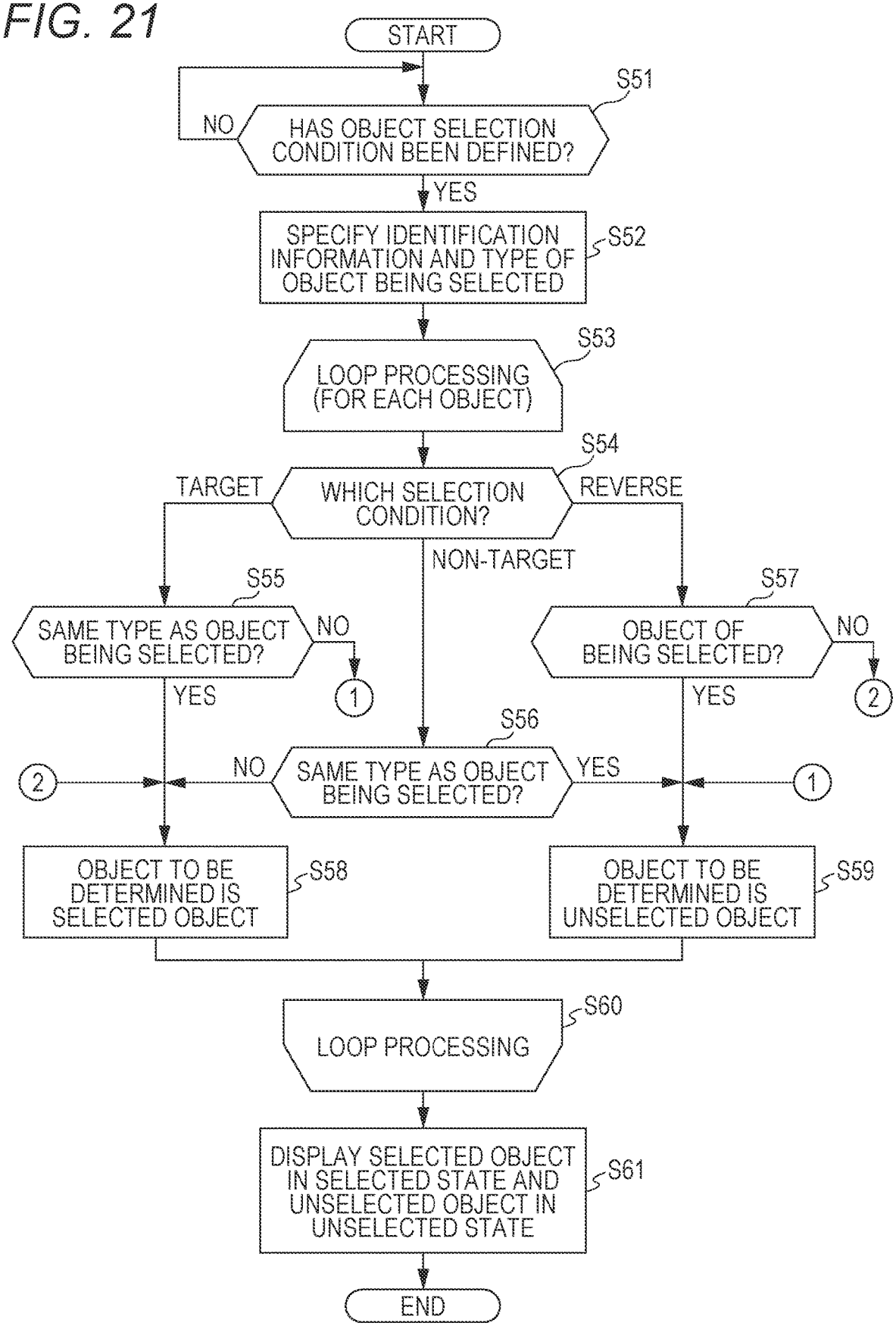
FIG. 21 is a flowchart illustrating a third example of processing related to object selection performed by the information processing apparatus.

FIG. 21 is a flowchart explaining a third example of processing related to object selection performed by the information processing apparatus. The flowchart of FIG. 21 provides an example of processing related to object selection described above with reference to FIGS. 17 to 20. For example, when an object arranged in the editing area 220 is selected, the information processing apparatus 1 executing the application displays the information 235 illustrated in FIG. 17 and the like in the editing screen 200 and starts the processing illustrated in FIG. 21. The position where the information 235 is displayed is not limited to a specific position in the editing screen 200. Furthermore, the information 235 is not limited to be displayed in the editing screen 200, and may be displayed as a sub screen (sub window) different from the editing screen 200.

First, the information processing apparatus 1 determines whether or not an object selection condition associated with the information 235 has been defined (step S51). In step S51, for example, in a case where an operation of designating (selecting) any one of "TARGET", "NON-TARGET", and "REVERSE" is performed by a radio button included in the information 235, the information processing apparatus 1 determines that the selection condition has been defined.

When the selection condition has been defined (step S51; YES), the information processing apparatus 1 acquires the identification information and the type of the object being selected (step S52). The identification information of the object is information for identifying (distinguishing) the objects arranged in the editing area 220 in units of objects. Thereafter, the information processing apparatus 1 performs loop processing (steps S53 to S60) of determining, for each object arranged in the editing area 220 of the editing screen 200, whether or not the object is an object to be brought into a selected state, and switches the display of the object (selected object) determined to be brought into the selected state to the display indicating as being in the selected state (step S61).

For example, the information processing apparatus 1 selects an object to be determined at the starting point of the loop processing (step S53). Next, the information processing apparatus 1 determines whether the selection condition defined in step S51 is TARGET, NON-TARGET, or REVERSE (step S54).

In a case where the selection condition is TARGET (step S54; TARGET), the information processing apparatus 1 then determines whether or not the object to be determined is same in type as the object being selected (step S55). If the object is same in type (step S55; YES), the information processing apparatus 1 sets the object to be determined as an object (selected object) to be displayed so as to indicate as being in the selected state (step S58). When the object is not same in type (step S55; NO), the information processing apparatus 1 sets the object to be determined as an object (unselected object) to be displayed so as to indicate as being in the unselected state (step S59).

In a case where the selection condition is NON-TARGET (step S54; NON-TARGET), the information processing apparatus 1 then determines whether or not the object to be determined is same in type as the object being selected (step S56). When the object is same in type (step S56; YES), the information processing apparatus 1 sets the object to be determined as an unselected object (step S59). When the object is not same in type (step S56; NO), the information processing apparatus 1 sets the object to be determined as a selected object (step S58).

When the selection condition is REVERSE (step S54; REVERSE), the information processing apparatus 1 then determines whether or not the object to be determined is an object being selected based on the identification information of the object (step S57). When the object to be determined is the object being selected (step S57; YES), the information processing apparatus 1 sets the object to be determined as an unselected object (step S59). When the object to be determined is not the object being selected (step S57; NO), the information processing apparatus 1 sets the object to be determined as a selected object (step S58).

After step S58 or S59, for example, at the end of the loop processing (step S60), the information processing apparatus 1 determines whether or not all the objects arranged in the editing area 220 are specified as a selected object or an unselected object. In a case where there remain any objects that have not been specified as the selected object or the unselected object, the information processing apparatus 1 continues the loop processing. When all the objects are specified as the selected object or the unselected object, the information processing apparatus 1 ends the loop processing. After the loop processing ends, the information processing apparatus 1 displays the selected object to indicate as being in the selected state, displays the unselected object to indicate as being in the unselected state (step S61), and ends the processing related to object selection.

Note that the processing executed by the information processing apparatus 1 to implement the object selection method described above with reference to FIGS. 17 to 20 is not limited to the processing according to the flowchart illustrated in FIG. 21, and can be changed as appropriate.

As described above, in the object layout editing processing according to the embodiment of the present disclosure, the object selection condition associated with the operation different from the method of directly designating the object can be designated and appropriately changed by the user of the information processing apparatus 1 executing the application. Therefore, the object arranged in the editing area 220 of the editing screen 200 can be selected by an operation suitable for the preference of the user, and the burden on the user in the editing work of the layout of the object can be suppressed.

In the object layout editing processing according to the embodiment of the present disclosure, for example, a selection condition when selecting objects in response to an operation of designating a range can be designated and appropriately changed by the user to any one of a first selection condition for bringing objects entirely included in the designated range into a selected state and bringing the other objects into an unselected state, and a second selection condition for bringing objects at least partially included in the designated range into a selected state and bringing the other objects into an unselected state. The first selection condition makes it possible to prevent an object that is not desired to be selected from being selected, for example, in a case of selecting some objects among a plurality of objects. The second selection condition makes it possible to prevent some objects from being excluded from the selection target, for example, in a case of selecting all of a plurality of objects.

In the object layout editing processing according to the embodiment of the present disclosure, for example, a selection condition for selecting objects in response to designation of a range by an operation of designating the range started in a state where an object is selected can be designated and appropriately changed by the user to any one of a third selection condition for bringing objects same in type as the object selected when the operation of designating the range is performed (or started) into a selected state, and a fourth selection condition for bringing objects different in type from the object selected when the operation of designating the range is performed into a selected state. The third selection condition makes it possible to prevent an object of a type that is not desired to be selected from being selected, for example, in a case of selecting a single type of object among a plurality of objects. The fourth selection condition makes it possible to facilitate an operation, for example, in a case of selecting a plurality of objects between which a single type of object is arranged among the plurality of objects. For example, in a case where a plurality of objects of the third type are arranged between the objects of the first type and the objects of the second type, it is possible to easily select only the objects of the first type and the objects of the second type by selecting the objects of the third type in a state where the fourth selection condition is selected and performing an operation of designating a range in which the objects of the first type, the objects of the second type, and the objects of the third type are included. Furthermore, in a case where an operation of designating a range is performed in a state where the third selection condition or the fourth selection condition is selected (applied), the information processing apparatus 1 may display an object that can be a selection target on the display 33 so as to be relatively emphasized as compared with an object that can be excluded from the selection target, based on the type of the object selected when the operation of designating a range is performed and the selection condition. In this way, it is possible to perform an operation of designating a range while visually confirming an object that can be a selection target, and it is possible to prevent an object desired to be selected from being excluded from the selection target.

Furthermore, in the object layout editing processing according to the embodiment of the present disclosure, for example, a selection condition for selecting objects in response to designation of a range by an operation of designating the range performed (or started) in a state where an object is selected can be designated and appropriately changed by the user to any one of a fifth selection condition for bringing all objects other than the object selected when the operation of designating the range is performed into a selected state, and a sixth selection condition for bringing all objects different in type from the object selected when the operation of designating the range is performed into a selected state. The fifth selection condition makes it possible to easily select only the object desired to be selected, for example, in a case where the number of objects desired to be selected among the plurality of objects is larger than the number of objects not desired to be selected, as compared with a selection method of continuously and directly designating each of the objects desired to be selected. The sixth selection condition makes it possible to further facilitate an operation of selecting only an object desired to be selected, for example, in a case where a plurality of objects same in type are included in objects not desired to be selected.

Furthermore, in the object layout editing processing according to the embodiment of the present disclosure, for example, it is possible to select and change a selection condition when selecting an object by a selection operation different from an operation of directly designating an object and an operation of designating a range, which can be performed in a state where the object is selected. More specifically, the user can designate and appropriately change any of a seventh selection condition for bringing an object same in type as the object selected when the selection operation is performed into a selected state, an eighth selection condition for bringing an object different in type from the object selected when the selection operation is performed into a selected state, and a ninth selection condition for bringing an object other than the object selected when the selection operation is performed into a selected state. The seventh selection condition makes it possible to easily select only the object of the type desired to be selected, for example, in a case where the number of objects of the type desired to be selected among the plurality of objects is large, as compared with a selection method of continuously and directly designating each of the objects desired to be selected. The eighth selection condition makes it possible to easily select an object, for example, in a case where the number of objects of types that are desired to be selected among a plurality of objects is large, by applying a small number of objects of the types that are not desired to be selected in a selected state. The ninth selection condition makes it possible to easily select an object, for example, in a case where the number of objects desired to be selected among a plurality of objects is large, by applying a small number of objects that are not desired to be selected in a selected state.

Note that the above-described embodiments are merely examples for facilitating understanding of the present disclosure. That is, the editing method, the recording medium, and the information processing apparatus according to the present disclosure are not limited to the above-described embodiments, and various modifications and changes can be made without departing from the scope of the claims.

For example, the object selection methods individually exemplified in the above-described embodiments can also be applied in combination. For example, it can be said that the object selection method described with reference to the flowchart of FIG. 13 is a selection method in which the object selection method based on one of the first selection condition and the second selection condition is combined with the object selection method based on one of the third selection condition and the fourth selection condition.

Furthermore, the object selection method described above may be combined with, for example, a selection method in which the user can designate and appropriately change the type (classification) of the object to be in a selected state and the type of the object to be in an unselected state. For example, the information 232 indicating the object selection condition may include a selection element that can change, to the unselected state, only specific types of objects that are displayed in a selected state with an operation of designating a range of objects, separately from a radio button for designating which of the first selection condition and the second selection condition is used for selecting objects. More specifically, to the information indicating the object selection condition such as the information 232, a radio button or a check box may be added that can designate a type that is desired to be changed to the unselected state (not desired to be in the selected state) among a plurality of object types (classifications) such as "text", "graphic", and "barcode".

Furthermore, the "SAME TYPE" in the object selection method described above may be on condition that all pieces of information except for the information regarding the position are the same among the pieces of information regarding the object including the dimensions, the direction, and the like, or may be on condition that some pieces of information such as the dimensions, the direction, and the like may be different. For example, in FIG. 10, a graphical (triangular) object 261 displayed as 261a indicating as being in the selected state is arranged in a direction in which a third vertex exists above a side connecting two vertices. The "SAME TYPE" in this case may or may not include the object 261 arranged in a direction in which the third vertex exists below the side connecting the two vertices. Furthermore, the definition of the object regarded as the "SAME TYPE" may be designated and appropriately changed by the user.

Furthermore, in the above-described embodiments, the object selection condition can be switched by the radio buttons, but the method of switching the object selection condition may not be performed using the radio buttons, and may be performed by predetermined key input (operation). For example, the object selection condition may be switched when a key operation using a keyboard or the like is performed while or after a range designation operation such as mouse drag is performed. Furthermore, the object selection condition may be made different depending on the direction (for example, drag operation of the mouse from the upper left to the lower right of the screen, drag operation of the mouse from the upper right to the lower left of the screen, and the like) of the operation for designating the range. As a result, switching does not need to be performed each time using a radio button, and editing can be efficiently performed. Note that the method of switching the object selection condition may be used in combination with a method of switching using a radio button.

Furthermore, the object selection method described above is not limited to the application executed by the information processing apparatus 1 different from the printing apparatus 10, and for example, may be performed in the printing apparatus 10 including an input device such as a keyboard available for editing the layout of an object and a display device that displays an editing screen on which the layout of an object is capable of being edited.

Furthermore, in the embodiments described above, the object selection method in the application associated with the printing apparatus 10 that performs printing on the tape-shaped print medium 21 has been exemplified, but the object selection method according to the present disclosure may be applied to other applications.

What is claimed is:

1. An editing method being performed by a computer, the editing method comprising:
   causing a display to display an editing screen on which a layout of an object is capable of being edited; and
   enabling switching of a selection condition for each object on the editing screen to be brought into one of a selected state and an unselected state based on a selection operation by a user,
   wherein the selection condition comprises a first selection condition which defines which objects among objects displayed on the editing screen are brought into one of the selected state and the unselected state in response to the selection operation by the user, and a second selection condition which defines which objects among the objects displayed on the editing screen are brought into one of the selected state and the unselected state in response to the selection operation by the user, the second selection condition being different from the first selection condition.

2. The editing method according to claim 1, wherein
   the selection operation by the user includes an operation of designating a range in the editing screen, and
   the first selection condition is a condition for bringing an object whose own area is entirely included in the designated range into the selected state and the second selection condition is a condition for bringing an object whose own area is at least partially included in the designated range into the selected state.

3. The editing method according to claim 2, wherein
   the selection operation by the user includes an operation of designating a range in the editing screen performed in a state where at least one object is selected, and
   the selection condition further includes at least one of a third selection condition for bringing an object same in type as the object in the selected state into the selected state and a fourth selection condition for bringing an object different in type from the object in the selected state into the selected state.

4. The editing method according to claim 2, wherein
   the selection operation by the user includes an operation of designating a range in the editing screen performed in a state where at least one object is selected, and
   the selection condition further includes at least one of a fifth third selection condition for bringing all objects other than the object in the selected state into the selected state and fourth selection condition for bringing all objects different in type from the object in the selected state into the selected state.

5. The editing method according to claim 2, wherein
   the selection operation by the user includes an operation of selecting at least one object,
   the selection condition further includes any one of a third selection condition for bringing an object that is the same in type as the selected object into the selected state, a fourth selection condition for bringing an object that is different in type from the selected object into the selected state, and a fifth selection condition for bringing all objects other than the selected object into the selected state, and
   the enabling switching of the selection condition includes an operation of designating any one of the first through fifth selection conditions.

6. The editing method according to claim 1, wherein
   the selection operation by the user includes an operation of designating a range in the editing screen performed in a state where at least one object is selected, and
   the first selection condition is a condition for bringing an object that is the same in type as the object in the selected state into the selected state and the second selection condition is a condition for bringing an object that is different in type from the object in the selected state into the selected state.

7. The editing method according to claim 6, wherein
   the computer is configured to change display of an object in such a manner that an object that is capable of being in the selected state is emphasized as compared with an object that is not a selection target, based on the selection condition while an operation of designating a range in the editing screen is performed.

8. The editing method according to claim 6, wherein
   the selection operation by the user includes the operation of designating the range in the editing screen performed in the state where at least one object is selected, and
   the selection condition further includes at least one of a fifth third selection condition for bringing all objects other than the object in the selected state into the selected state and a fourth selection condition for bringing all objects different in type from the object in the selected state into the selected state.

9. The editing method according to claim 6, wherein
   the selection operation by the user includes an operation of selecting at least one object,
   the selection condition further includes any one of a third selection condition for bringing an object that is the same in type as the object selected by the operation into the selected state, a fourth selection condition for bringing an object that is different in type from the object selected by the operation into the selected state, and a fifth selection condition for bringing all objects other than the object selected by the operation into the selected state, and
   the enabling switching of the selection condition includes an operation of designating any one of the first through fifth selection conditions.

10. The editing method according to claim 1, wherein
    the selection operation by the user includes an operation of designating a range in the editing screen performed in a state where at least one object is selected, and
    the first selection condition is a condition for bringing all objects other than the object in the selected state into the selected state and the second selection condition is a condition for bringing all objects different in type from the object in the selected state into the selected state.

11. The editing method according to claim 10, wherein
the computer is configured to change display of an object in such a manner that an object that is capable of being in the selected state is emphasized as compared with an object that is not a selection target, based on the selection condition while an operation of designating a range in the editing screen is performed.

12. The editing method according to claim 10, wherein
the selection operation by the user includes an operation of selecting at least one object,
the selection condition further includes any one of a third selection condition for bringing an object that is the same in type as the object selected by the operation into the selected state, a fourth selection condition for bringing an object different in type from the object selected by the operation into the selected state, and a fifth selection condition for bringing all objects other than the object selected by the operation into the selected state, and
the enabling switching of the selection condition includes an operation of designating any one of the first through fifth selection conditions.

13. The editing method according to claim 1, wherein
the selection operation by the user includes an operation of selecting at least one object,
the enabling switching of the selection condition includes an operation of designating any one of the first selection condition, the second selection condition, and a third selection condition, and
the first selection condition is a condition for bringing an object that is the same in type as the selected object into the selected state, the second selection condition is a condition for bringing an object that is different in type from the selected object into the selected state, and the third selection condition is a condition for bringing all objects other than the selected object into the selected state.

14. The editing method according to claim 1, wherein
the editing screen is a screen for editing a layout of an object to be printed on a print medium.

15. A non-transitory computer-readable recording medium storing a program for causing a computer to execute processing of:
causing a display to display an editing screen on which a layout of an object is capable of being edited; and
enabling switching of a selection condition for each object on the editing screen to be brought into one of a selected state and an unselected state based on a selection operation by a user,
wherein the selection condition comprises a first selection condition which defines which objects among objects displayed on the editing screen are brought into one of the selected state and the unselected state in response to the selection operation by the user, and a second selection condition which defines which objects among the objects displayed on the editing screen are brought into one of the selected state and the unselected state in response to the selection operation by the user, the second selection condition being different from the first selection condition.

16. An information processing apparatus comprising:
a controller configured to cause a display device to display an editing screen on which a layout of an object is capable of being edited, and to enable switching of a selection condition for each object on the editing screen to be brought into one of a selected state and an unselected state based on a selection operation by a user,
wherein the selection condition comprises a first selection condition which defines which objects among objects displayed on the editing screen are brought into one of the selected state and the unselected state in response to the selection operation by the user, and a second selection condition which defines which objects among the objects displayed on the editing screen are brought into one of the selected state and the unselected state in response to the selection operation by the user, the second selection condition being different from the first selection condition.

17. A printing apparatus comprising:
a printer configured to perform printing on a print medium; and
a controller configured to cause a display to display an editing screen on which a layout of an object to be printed on the print medium is capable of being edited, and to enable switching of a selection condition for each object on the editing screen to be brought into one of a selected state and an unselected state based on a selection operation by a user,
wherein the selection condition comprises a first selection condition which defines which objects among objects displayed on the editing screen are brought into one of the selected state and the unselected state in response to the selection operation by the user, and a second selection condition which defines which objects among the objects displayed on the editing screen are brought into one of the selected state and the unselected state in response to the selection operation by the user, the second selection condition being different from the first selection condition.

* * * * *